US011722935B2

(12) United States Patent
Tseng et al.

(10) Patent No.: US 11,722,935 B2
(45) Date of Patent: Aug. 8, 2023

(54) WIRELESS COMMUNICATION METHOD AND USER EQUIPMENT FOR NON-PUBLIC NETWORK CONTROL MECHANISMS

(71) Applicant: FG Innovation Company Limited, Tuen Mun (HK)

(72) Inventors: Yung-Lan Tseng, Taipei (TW); Mei-Ju Shih, Taipei (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/202,673

(22) Filed: Mar. 16, 2021

(65) Prior Publication Data

US 2021/0289404 A1  Sep. 16, 2021

Related U.S. Application Data

(60) Provisional application No. 62/990,392, filed on Mar. 16, 2020.

(51) Int. Cl.
| | |
|---|---|
| *H04W 4/00* | (2018.01) |
| *H04W 36/00* | (2009.01) |
| *H04W 76/38* | (2018.01) |
| *H04W 36/36* | (2009.01) |
| *H04W 48/18* | (2009.01) |

(52) U.S. Cl.
CPC ....... *H04W 36/0066* (2013.01); *H04W 36/36* (2013.01); *H04W 48/18* (2013.01); *H04W 76/38* (2018.02)

(58) Field of Classification Search
CPC ......... H04W 36/0005; H04W 36/0055; H04W 36/0066; H04W 36/0079; H04W 36/36; H04W 36/38; H04W 48/02; H04W 48/18; H04W 76/30; H04W 76/38
See application file for complete search history.

(56) References Cited

U.S. PATENT DOCUMENTS

| | | | |
|---|---|---|---|
| 2013/0288729 A1 | 10/2013 | Islam et al. | |
| 2014/0198640 A1* | 7/2014 | Suzuki | .................... H04L 47/76 370/230 |
| 2014/0287694 A1* | 9/2014 | Kim | ...................... H04W 64/00 455/67.11 |

(Continued)

FOREIGN PATENT DOCUMENTS

| | | |
|---|---|---|
| EP | 2658336 A1 | 10/2013 |
| WO | 2018/084565 A1 | 5/2018 |
| WO | 2018/167358 A1 | 9/2018 |

OTHER PUBLICATIONS

Qualcomm, "Introduction of PRN for TS 38.304", R2-2001898 3GPP TSG-RAN WG2 Meeting #109 electronic, Feb. 24-Mar. 6, 2020.

(Continued)

*Primary Examiner* — Matthew W Genack
(74) *Attorney, Agent, or Firm* — ScienBiziP, P.C.

(57) ABSTRACT

A method performed by a User Equipment (UE) includes receiving one of a stand-alone non-public network (SNPN) selection request, while the UE has stored at least one of cell (re)selection priorities (cellReselectionPriorities), deleting the stored at least one of cellReselectionPriorities when an SNPN selection in response to the SNPN selection request is performed by the UE, and stopping a T320 timer in response to receiving the SNPN selection request.

18 Claims, 13 Drawing Sheets

(56) References Cited

U.S. PATENT DOCUMENTS

| | | |
|---|---|---|
| 2016/0157290 A1* | 6/2016 | Lee .................... H04W 48/18 370/329 |
| 2017/0041854 A1* | 2/2017 | Kim .................... H04W 28/02 |
| 2019/0037425 A1* | 1/2019 | Hong .................... H04B 7/06 |
| 2019/0289660 A1 | 9/2019 | Yi et al. |
| 2019/0306764 A1 | 10/2019 | da Silva et al. |
| 2020/0053601 A1* | 2/2020 | Wu .................... H04W 36/0016 |
| 2020/0145146 A1 | 5/2020 | Decarreau et al. |

OTHER PUBLICATIONS

Qualcomm, "PRN Running CR for TS 38.304", R2-2001310 3GPP TSG-RAN WG2 Meeting #109 electronic, Feb. 24-Mar. 6, 2020.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 15)", V15.8.0 (Dec. 2019).

3GPP TS 38.133, "3rd Generation Partnership Project; Technical Specification Group Radio Access Network; NR; Requirements for support of radio resource management (Release 15)", V15.8.0 (Dec. 2019).

3GPP TS 38.215, "3rd Generation Partnership Project; Technical Specification Group Radio Access Network; NR; Physical layer measurements (Release 15)", V15.6.0 (Dec. 2019).

3GPP TS 38.304, "3rd Generation Partnership Project; Technical Specification Group Radio Access Network; NR; User Equipment (UE) procedures in Idle mode and RRC Inactive state (Release 15)", V15.6 0 (Dec. 2019).

3GPP TS 22.261, "3rd Generation Partnership Project; Technical Specification Group Services and System Aspects; Service requirements for the 5G system; Stage 1 (Release 15)", V15.8.0 (Sep. 2019).

3GPP TS 23.122, "3rd Generation Partnership Project; Technical Specification Group Core Network and Terminals; Non-Access-Stratum (NAS) functions related to Mobile Station (MS) in idle mode (Release 15)", V15.7.0 (Mar. 2019).

3GPP TS 23.501, "3rd Generation Partnership Project; Technical Specification Group Services and System Aspects; System architecture for the 5G System (5GS); Stage 2 (Release 15)", V15.8.0 (Dec. 2019).

3GPP TS 24.501, "3rd Generation Partnership Project; Technical Specification Group Core Network and Terminals; Non-Access-Stratum (NAS) protocol for 5G System (5GS); Stage 3 (Release 15)", V15.6 0 (Dec. 2019).

3GPP TS 36.304, "3rd Generation Partnership Project; Technical Specification Group Radio Access Network; Evolved Universal Terrestrial Radio Access (E-UTRA); User Equipment (UE) procedures in idle mode (Release 15)", V15.5.0 (Dec. 2019).

3GPP TS 38.213, "3rd Generation Partnership Project; Technical Specification Group Radio Access Network; NR; Physical layer procedures for control (Release 15)", V15.8.0 (Dec. 2019).

3GPP TS 38.331, "3rd Generation Partnership Project; Technical Specification Group Radio Access Network; NR; Radio Resource Control (RRC) protocol specification (Release 15)", V15.8.0 (Dec. 2019).

3GPP TR 21.905, "3rd Generation Partnership Project; Technical Specification Group Services and System Aspects; Vocabulary for 3GPP Specifications (Release 15)", V15.1.0 (Dec. 2018).

* cited by examiner

FIG. 2A

NPN-IdentityInfoList information element

```
-- ASN1START
-- TAG-NPN-IDENTITYINFOLIST-START

NPN-IdentityInfoList-r16 ::=         SEQUENCE (SIZE (1..maxNPN-r16)) OF NPN-IdentityInfo-r16

NPN-IdentityInfo-r16 ::= SEQUENCE {
    npn-IdentityList-r16            SEQUENCE (SIZE (1..maxNPN-r16)) OF NPN-Identity-r16,
    trackingAreaCode-r16            TrackingAreaCode,
    ranac-r16                       RAN-AreaCode                                        OPTIONAL,
    -- Need R
    cellIdentity-r16                CellIdentity,
    cellReservedForOperatorUse-r16  ENUMERATED {reserved, notReserved},
    ...
}

-- TAG-NPN-IDENTITYINFOLIST-STOP
-- ASN1STOP
```

FIG. 2B

NPN-IdentityInfoList field description(s)

NPN-IdentityInfoList field descriptionsNPN-IdentityInfo
The *NPN-IdentityInfo* contains one or more NPN identities and additional information associated with those NPNs. Only the same type of NPNs (either SNPNs or PNI-NPNs) can be listed in a *NPN-IdentityInfo* element.

npn-IdentityList
The *npn-IdentityList* contains one or more NPN Identity elements.

trackingAreaCode
Indicates the Tracking Area Code to which the cell indicated by cellIdentity field belongs.

ranac
Indicates the RAN Area Code to which the cell indicated by cellIdentity field belongs.

trackingAreaCode
Indicates Tracking Area Code to which the cell indicated by cellIdentity field belongs.

cellReservedForOperatorUse
Indicates whether the cell is reserved for operator use (for the NPN(s) identified in the *npn-IdentyList*) as defined in TS 38.304.

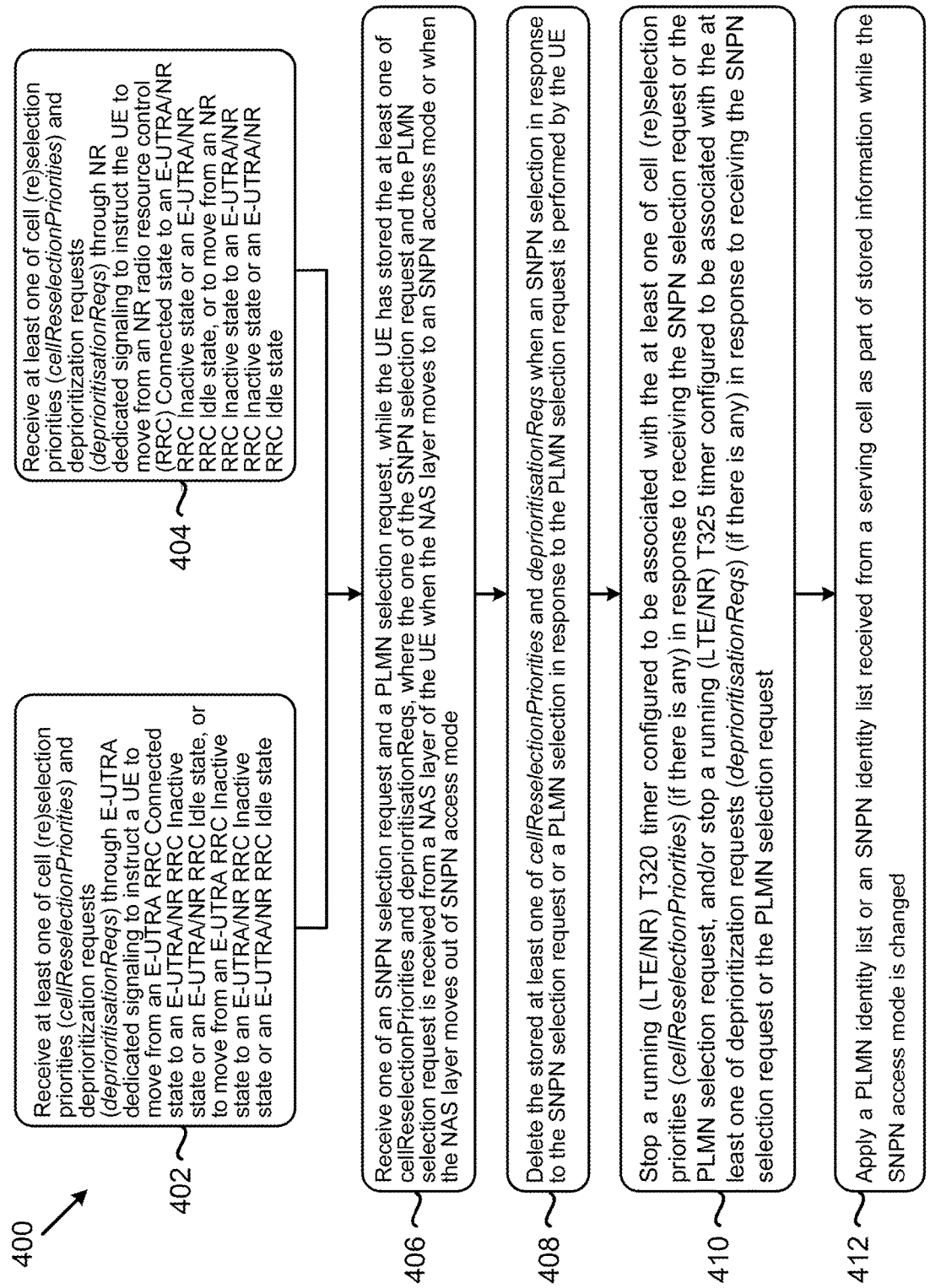

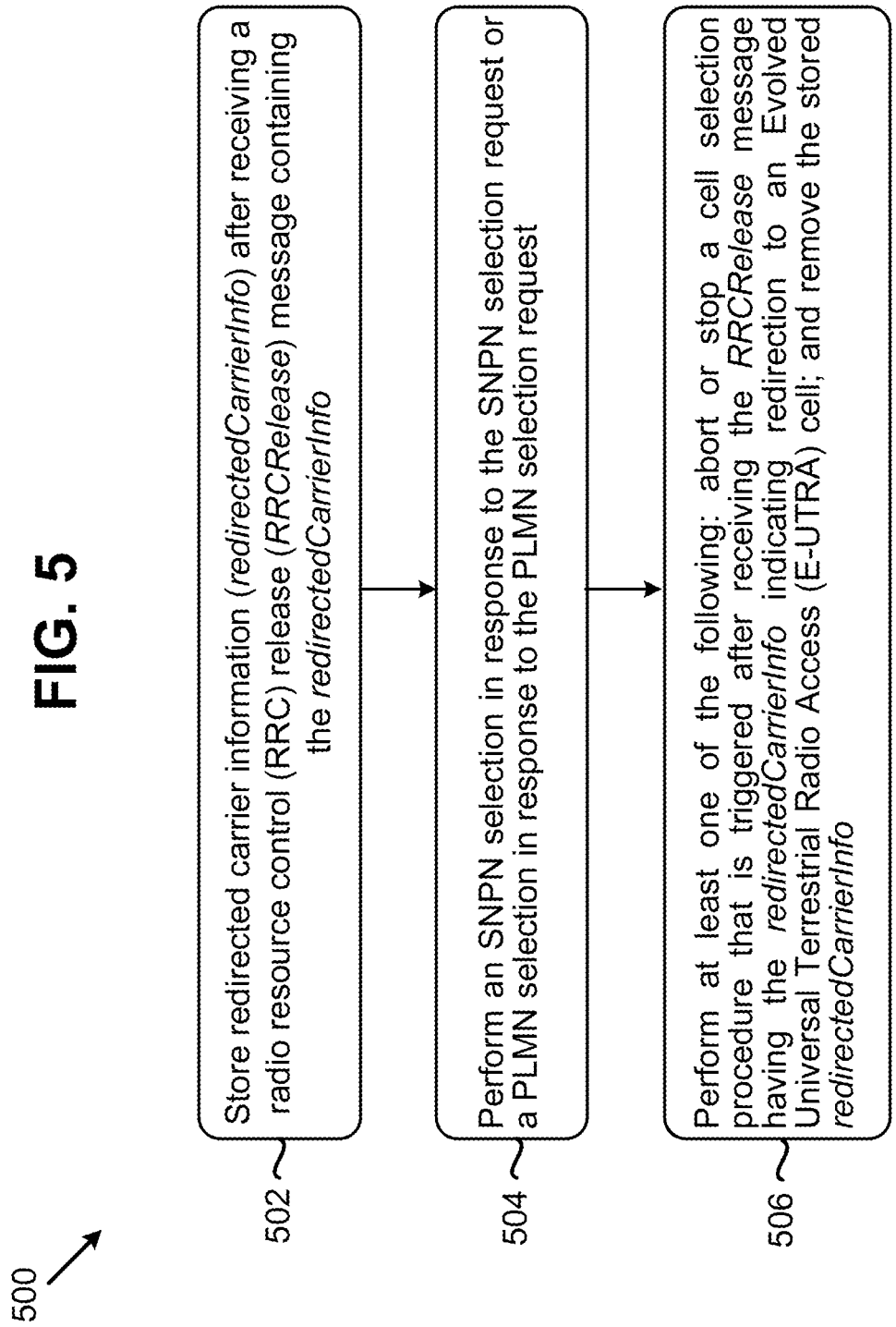

WIRELESS COMMUNICATION METHOD AND USER EQUIPMENT FOR NON-PUBLIC NETWORK CONTROL MECHANISMS

CROSS-REFERENCE TO RELATED APPLICATION(S)

The present disclosure claims the benefit of and priority to provisional U.S. Patent Application Ser. No. 62/990,392 ("the '392 provisional"), filed on Mar. 16, 2020, entitled "Non-Public Network Control Mechanisms for User Equipment". The content(s) of the '392 provisional are fully incorporated herein by reference for all purposes.

FIELD

The present disclosure is generally related to wireless communications, and more specifically, to a wireless communication method and a user equipment (UE) for non-public network (NPN) control mechanisms.

BACKGROUND

In the next-generation wireless communication system (e.g., a fifth-generation (5G) New Radio (NR) wireless communication system), NPNs will be deployed for non-public use. An NPN may be deployed as a Stand-alone NPN (SNPN) or a Public Network Integrated (PNI)-NPN. An SNPN may be operated by an NPN operator alone without relying on network functions provided by a Public Land Mobile Network (PLMN). A PNI-NPN may be an NPN deployed with the support of a PLMN.

The system architecture and solutions to support UE access control mechanisms have not yet been defined or developed. Thus, there is a need for further improvements in wireless communication for the next-generation wireless communication system.

SUMMARY

The present disclosure is directed to a wireless communication method and a UE for NPN control mechanisms.

According to an aspect of the present disclosure, a UE is provided. The UE includes one or more non-transitory computer-readable media having computer-executable instructions embodied thereon; and at least one processor coupled to the one or more non-transitory computer-readable media, and configured to execute the computer-executable instructions to: receive a stand-alone non-public network (SNPN) selection request, while the UE has stored at least one of cell (re)selection priorities (cellReselectionPriorities) and deprioritization requests (depriornisationReqs); delete the stored at least one of cellReselectionPriorities and deprioritisationReqs when an SNPN selection in response to the SNPN selection request is performed by the UE; and stop a T320 timer (also referred to as "T320") in response to receiving the SNPN selection request.

According to another aspect of the present disclosure, a method performed by a User Equipment (UE) includes receiving a stand-alone non-public network (SNPN) selection request, while the UE has stored at least one of cell (re)selection priorities (cellReselectionPriorities) and deprioritization requests (deprioritisationReqs), deleting the stored at least one of cellReselectionPriorities and deprioritisationReqs when an SNPN selection in response to the SNPN selection request is performed by the UE; and stopping a T320 timer in response to receiving the SNPN selection request.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

FIG. 2A illustrates an example NPN-IdentityInfoList information element, in accordance with an example implementation of the present disclosure.

FIG. 2B illustrates an example NPN-IdentityInfoList field description(s), in accordance with an example implementation of the present disclosure.

FIG. 4 illustrates a flowchart of a method performed by a UE, in accordance with an example implementation of the present disclosure.

FIG. 5 illustrates a flowchart of a method performed by a UE, in accordance with an example implementation of the present disclosure.

DESCRIPTION

Figure 1:
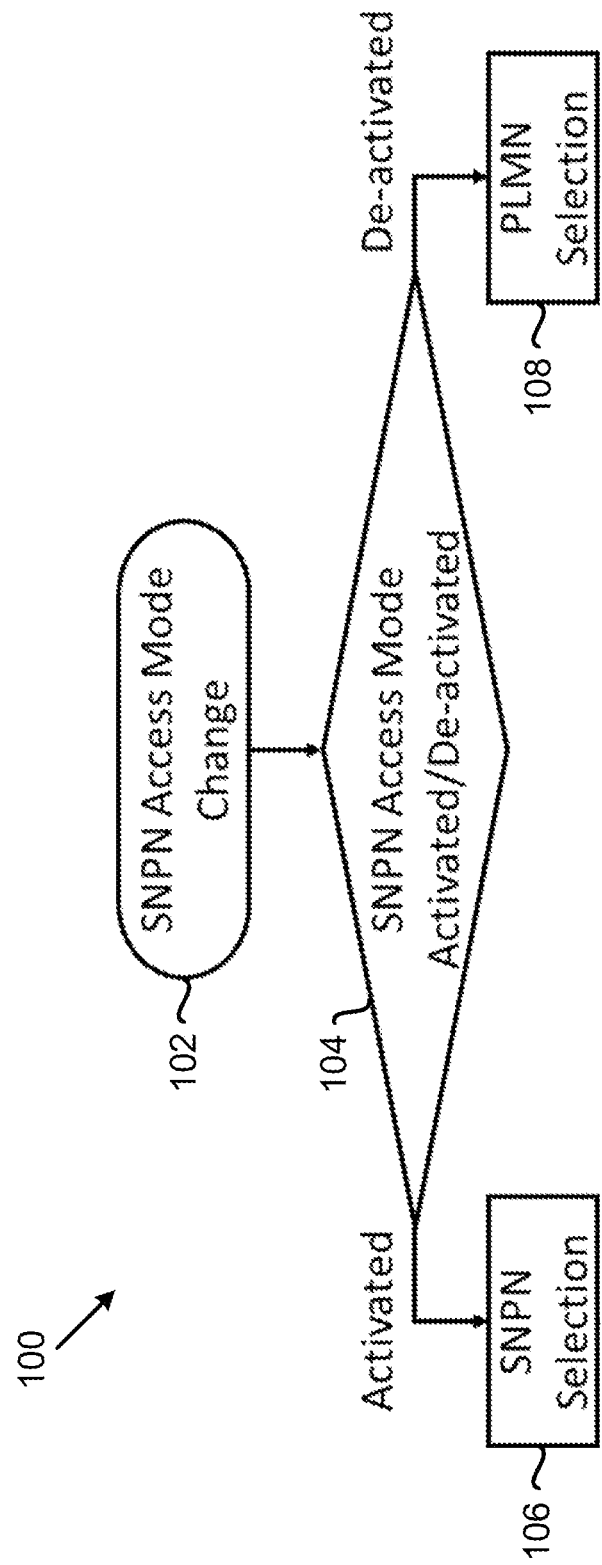
FIG. 1 illustrates a flowchart illustrating SNPN access mode activation and de-activation operations, in accordance with an example implementation of the present disclosure.

The acronyms mentioned in the present disclosure are defined as follows. Unless otherwise specified, the terms in the present disclosure have the following meanings.

Abbreviation Full name
3GPP 3rd Generation Partnership Project
5G 5th generation
AS Access Stratum
BA Bandwidth Aggregation
BFR Beam Failure Recovery
BS Base Station
BSR Buffer Status Reporting
BWP Band Width Part CA Carrier Aggregation
CAG Closed Access Group
CAG-ID Closed Access Group Identifier
CBRA Contention-Based Random Access
CC Component Carriers
CCCH Common Control CHannel
CE Control Element
CFRA Contention-Free Random Access
CG Cell Group
CMAS Commercial Mobile Alert System
CN Core Network
C-RNTI Cell-Radio Network Temporary Identifier
CS-RNTI Configured Scheduling-Radio Network Temporary Identifier
CSI Channel State Information
CSI-RS Channel State Information based Reference Signal
CQI Channel Quality Indicator
DCI Downlink Control Information
DL Downlink
DRB Data Radio Bearer
ETWS Earthquake and Tsunami Warning System
E-UTRA Evolved UMTS Terrestrial Radio Access
E-UTRAN Evolved UMTS Terrestrial Radio Access Network
HARQ Hybrid Automatic Repeat Request
HO Handover
HRNN Human-Readable Network Name
ID Identifier
IE Information Element
IMSI International Mobile Subscriber Identity
L1 Layer 1
L2 Layer 2
LCG Logical Channel Group
LCH Logical Channel
LCP Logical Channel Prioritization
LTE Long Term Evolution
MAC Medium Access Control
MCC Mobile Country Code
MCG Master Cell Group
MICO Mobile Initiated Connection Only
MIMO Multi-input Multi-output
MSG0 Message 0
MSG1 Message 1
MSG2 Message 2
MSG3 Message 3
MSG4 Message 4
MSGA Message A
MSGB Message B
NAS Non-Access Stratum
NID Network Identifier
NPN Non-Public Network
NR New Radio
NUL Normal Uplink
NW Network
PCell Primary Cell
PDCCH Physical Downlink Control Channel
PDCP Packet Data Convergence Protocol
PDU Protocol Data Unit
PHY Physical Layer
PLMN Public Land Mobile Network
PRACH Physical Random Access Channel
PSCell Primary SCell
PUCCH Physical Uplink Control Channel
PUSCH Physical Uplink Shared Channel
QoS Quality of Service
RA Random Access
RACH Random Access Channel
RAR Random Access Response
RAT Radio Access Technology
Rel-15 Release 15
Rel-16 Release 16
RLC Radio Link Control
RLF Radio Link Failure
RNA RAN-based Notification Area
RNAU RAN-based Notification Area Update
RNTI Radio Network Temporary Identifier
RRC Radio Resource Control
RS Reference Signal
RSRP Reference Signal Received Power
RTT Round Trip Time
SCell Secondary Cell
SCG Secondary Cell Group
SDU Service Data Unit
SI System Information
SIB System Information Block
SNPN Stand-alone Non-Public Network
SR Scheduling Request
SRB Signaling Radio Bearer
SRS Sounding Reference Signal
SSB Synchronization Signal Block
SpCell Special Cell
SUL Supplementary Uplink
TA Timing Advance
TAG Timing Advance Group
TR Technical Report
TRP Transmission/Reception Point
TS Technical Specification
UAC Unified Access Control
UE User Equipment
UL Uplink
UL-SCH Uplink Shared Channel
UMTS Universal Mobile Telecommunications System The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a specific feature, structure, or characteristic, but not every possible implementation of the present disclosure necessarily includes the specific feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the specific feature, structure, or characteristic, and should instead be understood to mean "at least some implementations of the present disclosure" includes the stated specific feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an Internet), through a Radio Access Network (RAN) established by the BS.

A UE according to the present disclosure may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in an RAN.

A BS according to the present disclosure may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned previously.

The BS may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate Sidelink (SL) resources for supporting Proximity Service (ProSe), LTE SL communication services, LTE SL discovery services, NR SL communication services, NR SL discovery services, and LTE/NR Vehicle-to-Everything (V2X) communication services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed previously, the frame structure for NR is to support flexible configurations for accommodating various next-generation (e.g., 5G) communication requirements, such as Enhanced Mobile Broadband (eMBB), Massive Machine Type Communications (mMTC), and Ultra-reliable and Low Latency Communications (URLLC), while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services or LTE sidelink communication/discovery service. In contrast, an SL resource may also be provided in an E-UTRA frame to support ProSe services or NR sidelink communication/discovery service.

In NR, a BS may allocate UL resources to a UE in consideration of a BSR provided by the UE. If the UE has a demand for UL transmissions but has not configured with UL resource(s) for transmitting the BSR, the UE may transmit a Scheduling Request (SR) procedure to request the UL resource(s). A Random Access (RA) procedure may be initiated if the UE finds that there is no available UL resource for the SR transmission.

In NR, a BS may allocate SL resources to a UE in consideration of a sidelink BSR provided by the UE. If the UE has a demand for SL transmissions but has not configured with SL resource(s) for transmitting the sidelink BSR, the UE may transmit an SR procedure or random access procedure to request the SL resource(s). An RA procedure may be initiated if the UE finds that there is no available UL resource for the SR transmission.

In some implementations of the present disclosure, an acceptable cell may be a cell that satisfies certain conditions as specified in Section 4.5 of 3GPP TS 38.304.

In some implementations of the present disclosure, an allowed CAG list may include a per-PLMN list of CAG Identifiers the UE is allowed to access (see TS 23.501).

In some implementations of the present disclosure, an available PLMN(s) may be one or more PLMN(s) for which the UE has found at least one cell and read its PLMN identity(ies).

In some implementations of the present disclosure, a barred cell may be a cell a UE is not allowed to camp on.

In some implementations of the present disclosure, a CAG cell may be a cell broadcasting at least one Closed Access Group Identifier.

In some implementations of the present disclosure, a CAG Member Cell may be, for a UE, a cell broadcasting the identity of the selected PLMN, registered PLMN or equivalent PLMN, and the cell broadcasts a CAG identifier belonging to the Allowed CAG list of the UE for that PLMN.

In some implementations of the present disclosure, a CAG-only cell may be a cell providing access only to CAGs.

In some implementations of the present disclosure, camped on a cell may mean that UE has completed the cell selection/reselection process and has chosen a cell. The UE monitors system information and (in most cases) paging information.

In some implementations of the present disclosure, camped on any cell may mean that a UE is in idle mode and has completed the cell selection/reselection process and has chosen a cell irrespective of PLMN identity.

In some implementations of the present disclosure, Closed Access Group Identifiers may identify a CAG within a PLMN.

In some implementations of the present disclosure, a Commercial Mobile Alert System may be a Public Warning System that delivers Warning Notifications provided by Warning Notification Providers to CMAS capable UEs.

In some implementations of the present disclosure, an EHPLMN may be any of the PLMN entries contained in the Equivalent HPLMN list TS 23.122.

In some implementations of the present disclosure, an Equivalent PLMN list may be a list of PLMNs considered as equivalent by the UE for cell selection, cell reselection, and handover according to the information provided by the NAS.

In some implementations of the present disclosure, a home PLMN may be a PLMN where the Mobile Country Code (MCC) and Mobile Network Code (MNC) of the PLMN identity are the same as the MCC and MNC of the In some implementations of the present disclosure, a Network Identifier may be one that identifies an SNPN in combination with a PLMN ID (TS 23.501).

In some implementations of the present disclosure, a Non-Public Network may be a network deployed for non-public use, as defined in TS 22.261.

In some implementations of the present disclosure, a process may be a local action in the UE invoked by an RRC procedure or an RRC_IDLE or RRC_INACTIVE state procedure.

In some implementations of the present disclosure, a Radio Access Technology may be a type of technology used for radio access, for instance NR or E-UTRA.

In some implementations of the present disclosure, a Registration Area may be a (NAS) registration area that is an area in which the UE may roam without a need to perform location registration, which is a NAS procedure.

In some implementations of the present disclosure, a Registered PLMN may be the PLMN on which certain Location Registration outcomes have occurred, as specified in TS 23.122.

In some implementations of the present disclosure, a Registered SNPN may be the SNPN on which certain Location Registration outcomes have occurred, as specified in TS 23.122.

In some implementations of the present disclosure, a Reserved Cell may be a cell on which camping is not allowed, except for particular UEs, if so indicated in the system information.

In some implementations of the present disclosure, a selected PLMN may be the PLMN that has been selected by the NAS, either manually or automatically.

In some implementations of the present disclosure, a selected SNPN may be the SNPN that has been selected by the NAS, either manually or automatically.

In some implementations of the present disclosure, a serving cell may be a cell on which the UE is camped.

In some implementations of the present disclosure, an SNPN Access Mode may be a mode of operation wherein UE only selects SNPNs (as defined in TS 23.501).

In some implementations of the present disclosure, an SNPN identity may be an identifier of an SNPN comprising of a PLMN ID (e.g., PLMN Identifier) and an NID (e.g., Network Identifier) combination. In some implementations, an SNPN identity may be one-to-one mapped to a specific SNPN. In some implementations, an SNPN identity may be globally unique. In some implementations, an SNPN identity may be unique in a PLMN (e.g., the associated PLMN). In some other implementations, an SNPN identity may be unique in a tracking area/registration area of the associated PLMN. In some other implementations, an SNPN identity may be unique in a (pre-defined) physical area.

In some implementations of the present disclosure, an SNPN-only cell may be a cell providing access only to SNPNs.

In some implementations of the present disclosure, the strongest cell may be the cell on a particular frequency that is considered strongest according to the layer 1 cell search procedure (TS 38.213, TS 38.215).

In some implementations of the present disclosure, a suitable cell may be a cell on which a UE may camp. For NR cell, the criteria are defined in clause 4.5, for E-UTRA cell in TS 36.304.

In the 3GPP Release-16, a UE that is enabled to access SNPN (e.g., an SNPN enabled UE) may be configured to operate in SNPN access mode (e.g., to activate the SNPN access mode) or not to operate in SNPN access mode (e.g., to de-activate the SNPN access mode). For a UE operating in an SNPN access mode, the UE may implement SNPN selection (and cell selection/reselection procedures based on the selected/registered SNPN) to camp on a cell (e.g., a suitable cell). For a UE not operating in an SNPN access mode, the UE may implement PLMN selection (and cell selection/reselection procedures based on the selected/registered PLMN) to camp on a cell (e.g., a suitable cell). Moreover, details of activation and deactivation of an SNPN access mode at an SNPN enabled UE may be up to UE implementation. For example, a UE may change/switch SNPN access mode based on instructions of the NAS layer on the UE side or by dedicated control signaling transmitted by the NAS layer on the Core Network (CN) side.

FIG. 1 illustrates a flow diagram showing SNPN access mode activation and de-activation operations, in accordance with an example implementation of the present disclosure.

In action 102, a UE may change/switch SNPN access mode. For example, the NAS layer may switch the SNPN access mode (e.g., activate/de-activate the SNPN access mode) and forward this decision to the AS layer on the UE side.

In action 104, the UE may determine whether the SNPN access mode is SNPN access mode activation (e.g., SNPN Access Mode Activated) or de-activation (e.g., SNPN Access Mode De-activated). If the SNPN access mode is activated, then the flowchart proceeds to action 106. If the SNPN access mode is de-activated, then the flowchart proceeds to action 108.

In action 106, the UE may perform/implement SNPN selection. For example, the NAS layer may activate the de-activated SNPN access mode and the AS layer on the UE side may be triggered to implement SNPN selection (e.g., after receiving the SNPN selection request delivered from the NAS layer to the AS layer).

In action 108, the UE may perform/implement PLMN selection. For example, the NAS layer may de-activate the activated SNPN access mode and the AS layer on the UE side may be triggered to implement PLMN selection (e.g., after receiving the PLMN selection request delivered from the NAS layer to the AS layer).

In some implementations, the UE (e.g., the NAS layer on the UE side) may send a request to indicate its preferred access mode (e.g., the UE may prefer SNPN Access Mode being activated or de-activated) to the network (e.g., the NAS layer on the CN side). In some implementations, the UE may directly indicate its preferred NW type(s) (e.g., PLMN or SNPN) to the core network or to the serving RAN.

In some implementations, the UE may delete the stored deprioritization request(s) when a PLMN selection or SNPN selection may be performed on request by the NAS layer. In one implementation, the UE is configured to delete priorities stored on the UE side when a PLMN selection or an SNPN selection is performed on request by the NAS layer.

The present disclosure provides detailed various mechanisms in response to and/or to facilitate handling of SNPN access mode change.

In the current 3GPP Specification TS 38.304, Reselection Priorities Handling is described as follows.

In case UE receives RRCRelease with deprioritisationReq, UE shall consider current frequency and stored frequencies due to the previously received RRCRelease with deprioritisationReq or all the frequencies of NR to be the lowest priority frequency (i.e., lower than any of the network configured values) while a T325 timer (also referred to as "T325") (e.g., which may be optionally configured with the deprioritisationReq in the RRCRelease message) is running irrespective of camped RAT (e.g., E-UTRA or NR). The UE shall delete the stored deprioritization request(s) when a PLMN selection or SNPN selection is performed on request by the NAS layer (TS 23.122). In some implementations, the running T325 may be stopped or be released while the UE starts to perform a PLMN selection or SNPN selection procedure on request by the NAS layer. In some implementations, the deprioritisationReq may indicate whether the current frequency of the serving cell is to be deprioritized or whether the current RAT (e.g., NR or E-UTRA) is to be deprioritized. In some implementations, one additional information element deprioritisationTimer (with a set of possible values, such as 5 minutes (min5), 10 minutes (min10), 15 minutes (min15), 30 minutes (min30)) may be configured with the deprioritisationReq to the UE. After receiving the deprioritisationTimer, the UE may set (e.g., initiate/activate) the T325 by configuring the initial value of the T325=deprioritisationTimer and then start the counting procedure of the T325.

It is noted that UE should search for a higher priority layer for cell reselection as soon as possible after the change of priority. The minimum related performance requirements specified in TS 38.133 are still applicable.

The UE shall delete priorities provided by dedicated signaling when:
  the UE enters a different RRC state; or
  the optional validity time of dedicated priorities (T320) expires; or
  a PLMN selection or SNPN selection is performed on request by the NAS layer (TS 23.122).

It is noted that equal priorities between RATs are not supported.

The UE shall not consider any black listed cells as candidate for cell reselection.

The UE in (LTE/NR) RRC_IDLE state shall inherit the priorities provided by dedicated signaling and the remaining validity time (i.e., T320 in NR and E-UTRA), if configured, at inter-RAT cell (re)selection.

However, besides the stored deprioritization requests, by considering the SNPN Access Mode change scenario (and the subsequent PLMN selection or SNPN selection procedure), additional UE behaviors will be clarified in the other sections of 3GPP technical specifications. For example, the UE behavior triggered by redirectedCarrierInfo reception in RRCRelease message should also consider the impact of SNPN Access Mode change, as shown in Implementation 1 below.

Therefore, Implementation 1 indicates changes need to be made in the technical specifications while the SNPN Access Mode is changed on the UE side (or while PLMN selection/ SNPN selection procedure is initiated due to SNPN Access Mode change).

It is noted that, in some implementations, the detailed mechanisms in the present disclosure may be also applicable to the condition where the SNPN access mode is changed from activated to de-activated, so that the AS layer on the UE side may start to implement PLMN selection. In some implementations, on the UE side, the UE may be configured with one PLMN access mode. In some implementations, the PLMN access mode may be activated or de-activated by the upper layers (e.g., the NAS layer). In addition, the UE may be triggered to implement PLMN selection if the UE's PLMN access mode is activated. In contrast, the UE may be triggered to implement SNPN selection (or other kinds of network selection) if the PLMN access mode is de-activated.

It should be noted that, while various implementations of the present disclosure are described with reference to SNPNs (e.g., SNPN selection mechanisms), the present disclosure is not limited to SNPN-related mechanisms. For example, implementations of the present disclosure may be applicable to PNI-NPNs (e.g., Closed Access Group (CAG) networks).

Implementation 1: redirectedCarrierInfo

In the current 3GPP TS 38.304, the impact of SNPN access mode changes (e.g., a PLMN selection or SNPN selection is performed on request by the NAS layer) to the UE behavior about redirectedCarrierInfo is not included in the 3GPP specifications. On the other hand, it is clearly indicated in the 3GPP specifications that "the UE shall delete priorities provided by dedicated signaling when a PLMN selection or SNPN selection is performed on request by NAS (TS 23.122)." Therefore, Implementation 1 provides UE behaviors about redirectedCarrierInfo by jointly considering the impact of SNPN access mode changes. Moreover, by considering the choice of RedirectedCarrierInfo includes both NR and E-UTRA. It is worthy to note that the SNPN (and the SNPN access mode) may not be supported in E-UTRA. Therefore, in some implementations, different UE behaviors may be applied based on the content of RedirectedCarrierInfo while the Information Element re-directs the UE to select E-UTRA.

In Implementation 1, to improve upon the current 3GPP TS 38.304 for selection of cell at transition to RRC_IDLE or RRC_INACTIVE state, at reception of RRCRelease message to transition the UE to RRC_IDLE or RRC_INACTIVE, the UE shall attempt to camp on a suitable cell according to redirectedCarrierInfo if included in the RRCRelease message. If the UE cannot find a suitable cell, the UE is allowed to camp on any suitable cell of the indicated RAT. If the RRCRelease message does not contain the redirectedCarrierInfo, UE shall attempt to select a suitable cell on an NR carrier. If no suitable cell is found according to the above, the UE shall perform cell selection using stored information in order to find a suitable cell to camp on.

The UE shall remove the stored redirectedCarrierInfo provided by RRCRelease message and/or stop reporting the received cnType (Core Network Type. e.g., EPC or 5GC) to upper layers when a PLMN selection or SNPN selection is performed on request by the NAS layer (e.g., by following the TS 23.122).

When returning to RRC_IDLE state after UE moved to RRC_CONNECTED state from camped on any cell state, UE shall attempt to camp on an acceptable cell according to redirectedCarrierInfo, if included in the RRCRelease message. If the UE cannot find an acceptable cell, the UE is allowed to camp on any acceptable cell of the indicated RAT. If the RRCRelease message does not contain redirectedCarrierInfo or the stored redirectedCarrierInfo is removed when a PLMN selection or SNPN selection is performed on request by the NAS layer, UE shall attempt to select an acceptable cell on an NR frequency. In addition, the UE shall stop reporting the available CN Type(s) or the received cnType to upper layers when a PLMN selection or SNPN selection is performed on request by the NAS layer.

If no acceptable cell is found according to the above, the UE shall continue to search for an acceptable cell of any PLMN (while the SNPN Access Mode is de-activate) or SNPN (e.g., while the SNPN Access Mode is activated) in state any cell selection.

Further in Implementation 1, to improve upon the current 3GPP TS 38.331, different UE behaviors may be applied based on the content of RedirectedCarrierInfo while the IE re-directs the UE to select E-UTRA. For example, the RedirectedCarrierInfo may consider both NR and E-UTRA.

Technical Specification (TS 38.331):

1> if the RRCRelease message includes redirectedCarrierInfo indicating redirection to eutra:
   2> if cnType is included:
      3> after the cell selection, indicate the available CN Type(s) and the received cnType to upper layers.

If SNPN access mode is changed, then:

(1) The UE may be requested to implement SNPN selection or PLMN selection due to the SNPN Access Mode is changed.

(2) The UE may abort/stop the cell (re)selection procedure which is triggered after receiving RRCRelease message includes redirectedCarrierInfo indicating redirection to eutra.

(3) In addition, in some of the embodiments, the UE may delete the stored redirectedCarrierInfo when a PLMN selection (or SNPN selection) is performed on request by the NAS layer (e.g., due to the SNPN Access Mode is changed) or when the SNPN Access Mode is changed.

(4) The UE may stop the procedure reporting of available CN Type(s) or the received cnType to upper layers.

In some implementations, an LTE UE (the UE which camps on E-UTRAN or the UE which is served by E-UTRAN) may keep the redirectedCarrierInfo for the case which E-UTRAN connected to 5GC may also support SNPN. In some implementations, the SNPN may also be implemented by E-UTRA cells and base stations in E-UTRAN (Evolved Universal Terrestrial Radio Access Network).

When the SNPN Access Mode has been changed (e.g., a PLMN selection or SNPN selection is performed on request by the NAS layer) on the UE side, the UE may implement the following instructions in different occasions:

(1) In some implementations, the UE may delete the stored redirectedCarrierInfo based on the target RAT of the redirectedCarrierInfo (e.g., UE would delete the redirectedCarrierInfo only while the redirectedCarrierInfo is indicating eutra or other RATs which does not support SNPN). In some other implementations, the UE would delete the stored redirectedCarrierInfo without regarding to the target RAT.

(2) Even though a PLMN selection or SNPN selection is performed on request by the NAS layer, the received redirectedCarrierInfo may be treated as part of stored information on the UE side. Then, if no suitable cell is found after a PLMN selection or SNPN selection is implemented on request by the NAS layer, the UE may perform cell (re)selection procedure using stored redirectedCarrierInfo in order to find a suitable cell to camp on.

(3) In some additional implementations, the SNPN may also be supported and be realized through E-UTRA. So, the redirectedCarrierInfo may be still kept even the SNPN access mode has been modified by the NAS layer. In some implementations, the NAS layer may transmit an explicit signaling to the AS layer of the UE side to further indicate that whether and/or which stored information (e.g., redirectedCarrierInfo or other priorities stored by the UE prior to the SNPN Access Mode is changed) is still applicable when the NAS layer requests the AS layer to implement SNPN selection or PLMN selection (e.g. due to the SNPN Access Mode change).

Implementation 2: cellReselectionPriority & deprioritisationReq

In the current 3GPP TS 38.304, Reselection Priorities Handling, absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e., the field cellReselectionPriority is absent for that frequency). If priorities are provided in dedicated signaling, the UE shall ignore all the priorities provided in system information. If UE is in camped on any cell state, UE shall only apply the priorities provided by system information from current cell, and the UE preserves priorities provided by dedicated signaling and deprioritisationReq received in RRCRelease unless specified otherwise. When the UE in camped normally state, has only dedicated priorities other than for the current frequency, the UE shall consider the current frequency to be the lowest priority frequency (i.e., lower than any of the network configured values).

The UE shall only perform cell reselection evaluation for NR frequencies and inter-RAT frequencies that are given in system information and for which the UE has a priority provided.

In case UE receives RRCRelease with deprioritisationReq, UE shall consider current frequency and stored frequencies due to the previously received RRCRelease with deprioritisationReq or all the frequencies of NR to be the lowest priority frequency (i.e., lower than any of the network configured values) while the (optionally configured) T325 is running irrespective of camped RAT. The UE shall delete the stored deprioritization request(s) when a PLMN selection or SNPN selection is performed on request by the NAS layer (TS 23.122). In some implementations, the running T325 may be stopped or be released while the UE starts to perform a PLMN selection or SNPN selection procedure on request by the NAS layer.

It is noted that the UE should search for a higher priority layer for cell reselection as soon as possible after the change of priority. The minimum related performance requirements specified in TS 38.133 are still applicable.

The UE shall delete priorities provided by dedicated signaling when:
  the UE enters a different RRC state; or
  the optional validity time of dedicated priorities (T320) expires; or
  a PLMN selection or SNPN selection is performed on request by the NAS layer (TS 23.122).

It is noted that equal priorities between RATs are not supported.

The UE shall not consider any black listed cells as candidate for cell reselection.

The UE in RRC_IDLE state shall inherit the priorities provided by dedicated signaling and the remaining validity time (i.e., T320 in NR and E-UTRA), if configured, at inter-RAT cell (re)selection.

It is noted that the network may assign dedicated cell reselection priorities for frequencies not configured by system information.

In some implementations of the present disclosure, the UE behavior as described in TS 38.331 may also be applied to LTE RRC idle/inactive UEs. Thus, implementations of the present disclosure may add the following UE behavior(s) to the TS 36.304:

The LTE RRC Idle/Inactive UE shall delete priorities provided by dedicated signaling when:
  the UE enters a different LTE RRC state; or
  the optional validity time of dedicated priorities (T320) expires; or
  a PLAIN selection or SNPN selection is performed on request by the NAS layer (e.g., TS 23.122).

The UE shall inherit the priorities provided by dedicated signaling and the remaining validity time (i.e., T320 timer in E-UTRA and NR, T322 timer in UTRA and T3230 timer in GERAN), if configured, at inter-RAT cell (re)selection. The UE in (LTE) RRC_IDLE state shall release the priorities provided by dedicated signaling of other RATs (e.g., NR) and the remaining validity time (i.e., T320 in NR) while the UE is requested to perform a PLMN selection or SNPN selection on request by the NAS layer. In some implementations, the (optionally configured) running T320 (e.g., T320 in E-UTRA protocols) may be stopped or be released while the UE starts to perform a PLMN selection or SNPN selection procedure on request by the NAS layer. In some implementations, the (optionally configured) running T320 (e.g., T320 in E-UTRA protocols) may be stopped or be released while the UE starts to perform inter-RAT cell (re)selection procedure (e.g., inter-RAT cell (re)selection procedure triggered due to a PLMN selection or SNPN selection procedure on request by the NAS layer).

Further in Implementation 2, to improve upon the current 3GPP TS 38.304, a UE in NR RRC_IDLE/RRC_INACTIVE state shall inherit the priorities provided by dedicated signaling and the remaining validity time (i.e., T320 in NR and E-UTRA), if configured, at inter-RAT cell (re)selection. The UE in (NR) RRC_IDLE/INACTIVE state shall release the priorities provided by (LTE) dedicated signaling and the remaining validity time (i.e., T320 in E-UTRA) while the UE is requested to perform a PLMN selection or SNPN selection on request by the NAS layer.

It should be noted that the network may assign dedicated cell reselection priorities for frequencies not configured by system information.

Further in Implementation 2, to improve upon the current 3GPP TS 38.331 and/or TS 36.331, in RRC protocols, the involved UE behaviour may include the cellReselectionPriorities and deprioritisationReq.

Case 1: cellReselectionPriorities

To improve the current TS 38.331 and/or TS36.331, implementations of the present disclosure include the following:

1> if the (LTE/NR) RRCRelease message includes the
2> cellReselectionPriorities:
   2> store the cell reselection priority information provided by the cellReselectionPriorities;
   2> if the (LTE/NR) t320 is included:
      3> start timer T320, with the timer value set according to the value of (LTE/NR) t320.

It should be noted that, in some implementations, cellReselectionPriorities, regardless of whether obtained from LTE dedicated signaling or NR dedicated signaling, may be (optionally) configured with one E-UTRA frequency priority list and/or one NR frequency priority list. In some implementations, the E-UTRA frequency priority list may be further composed by 1) one or more E-UTRA Absolute Radio-Frequency Channel Number (ARFCN) value, which each E-UTRA ARFCN value would be uniquely mapped to one E-UTRA frequency carrier; 2) a cellReselectionPriority value corresponding to the E-UTRA frequency carrier indicated by one configured E-UTRA ARFCN. In some implementations, The IE cellReselectionPriority concerns the absolute priority of the concerned carrier frequency, as used by the cell (re)selection procedure. In some implementations, cellReselectionPriority may be configured as one integer within the range between 0 . . . 7). In addition, the Value 0 means the lowest priority to the UE during the (LTE) cell (re)selection procedure; and 3) one optionally configured cellReselectionSubPriority corresponding to the E-UTRA frequency carrier indicated by one configured E-UTRA ARFCN. In some implementations, the IE CellReselectionSubPriority indicates a fractional value to be added to the value of cellReselectionPriority to obtain the absolute priority of the concerned E-UTRA frequency carrier. In some implementations, the value of CellReselectionSubPriority may be provided within some pre-configured candidates (e.g., {oDot2, oDot4, oDot8}. In addition, the Value oDot2 corresponds to 0.2, value oDot4 corresponds to 0.4 and so on). In some implementations, the NR frequency priority list may be further composed by 1) one or more NR Absolute Radio-Frequency Channel Number (ARFCN) value, which each NR ARFCN value would be uniquely mapped to one NR frequency carrier; 2) a cellReselectionPriority value corresponding to the NR frequency carrier indicated by one configured NR ARFCN. In some implementations, the IE cellReselectionPriority concerns the absolute priority of the concerned carrier frequency, as used by the (NR) cell (re)selection procedure. In some implementations, cellReselectionPriority may be configured as one integer within the range between 0 . . . 7). In addition, the Value 0 means the lowest priority and the Value 7 means the highest priority to the UE during the cell (re)selection procedure; and 3) one optionally configured cellReselectionSubPriority corresponding to the NR frequency carrier indicated by one configured NR ARFCN. In some implementations, the IE CellReselectionSubPriority indicates a fractional value to be added to the value of cellReselectionPriority to obtain the absolute priority of the concerned NR frequency carrier. In some implementations, the value of CellReselectionSubPriority may be provided within some pre-configured candidates (e.g., {oDot2, oDot4, oDot8}. In addition, the Value oDot2 corresponds to 0.2, value oDot4 corresponds to 0.4 and so on). So, to the UE, the UE may apply the stored E-UTRA frequency priority list while the UE is implementing E-UTRA cell (re)selection procedure. In contrast, the UE may apply the stored NR frequency priority list while the UE is implementing NR cell (re)selection procedure. In addition, the stored NR frequency priority list and/or E-UTRA frequency priority list would be associated with the same T320 counting procedure (while one T320 (E-UTRA protocols) is configured with the cellReselectionPriorities in the same E-UTRA dedicated signaling or while one T320 (NR protocols) is configured with the cellReselectionPriorities in the same NR dedicated signaling). During the (LTE/NR) cell (re)selection procedure, the UE would decide the priorities of the (LTE/NR) frequency carriers from the highest priority to the lowest priority by jointly considering the CellReselectionPriority and CellReselectionSubPriority (if it is provided) for each concerned (LTE/NR) frequency carriers.

In some implementations of the present disclosure, if SNPN access mode is changed (e.g., from SNPN access mode activated to de-activated or vice versa) in the NAS layer, then:

(1) The AS layer on the UE side may be requested to implement SNPN selection or PLMN selection due to the SNPN Access Mode is changed.

(2) The UE would stop the cell (re)selection procedure which is triggered after receiving RRCRelease message. In some implementations, the UE may trigger an inter-RAT cell (re)selection procedure (e.g., the UE may move from a camped E-UTRA cell to camp on an NR cell due to SNPN selection request received from the NAS layer). In some other implementations, the UE may trigger an intra-RAT cell (re)selection procedure (e.g., the UE may move from a camped NR cell to camp on an NR cell due to SNPN selection request received from the NAS layer).

(3) In addition, the UE may delete the stored cellReselectionPriority when a PLMN selection (or SNPN selection) procedure is performed on request by the NAS layer (e.g., due to the SNPN Access Mode is changed) or when the SNPN Access Mode is changed.

(4) In addition, the counting (LTE/NR) T320 may also be stopped and/or be released with the SNPN Access Mode change (e.g., before/after the inter-RAT cell (re)selection procedure, such as the UE transitions from LTE RRC idle/inactive state to NR RRC idle state or from the NR RRC idle state to LTE RRC idle state). In some implementations, the configured running LTE T320 may be stopped while the UE starts/triggers the inter-RAT cell (re)selection procedure (from E-UTRA protocols moves to NR protocols, after receiving the SNPN selection request from the NAS layer). In some implementations, the NAS layer may not transmit the SNPN selection request to the AS layer directly while E-UTRA protocols is implemented in the AS layer. Instead, the NAS layer may just trigger inter-RAT cell (re)selection procedure to the AS layer to re-direct the AS layer (from E-UTRA protocols) to NR protocols while the NAS layers decide to do select a SNPN (e.g., the SNPN access mode is activated in the NAS layer). It might because that E-UTRA protocols does not support SNPN and so the E-UTRA protocols may not be able to identify the SNPN selection request transmitted from the NAS layers). During the inter-RAT cell (re)selection procedure, with the stop of LTE T320, the UE may not implement NR cell (re)selection procedure based on the stored cellReselectionPriority. In this condition, the stop condition of LTE T320 is 'upon cell (re)selection procedure to another RAT'. In contrast, also upon the cell (re)selection procedure to NR RAT is triggered, an NR T320 may also be configured while LTE T320 is stopped. In addition, the initial value of NR T320 may inherit the stop value of LTE T320. However, please also note, the NR T320 may also be stopped directly when SNPN selection is performed on request by NAS in the NR protocols. It is noted that, in comparison with the E-UTRA protocols, the NAS layer may transmit the SNPN selection request to the AS layer while NR protocols are implemented in the AS layer (upon inter-RAT cell (re)selection procedure). It might because that NR protocols support SNPN and so the NR protocols can identify the SNPN selection request transmitted from the NAS layers. In addition, the NAS layer may also need to provide one triggering event to stop the T320 of NR protocols (i.e., NR T320). Here, the SNPN selection procedure may be considered as part of the inter-RAT cell (re)selection procedure (e.g., from E-UTRA protocol's point of view since the E-UTRA protocols may not be able to identify the SNPN selection request from the NAS layer while E-UTRA protocols does not support SNPN. In comparison, in E-UTRA protocols, a running LTE T320 may be stopped when PLMN selection is performed on request by NAS. It is because the E-UTRA protocols could identify the PLMN selection request from the NAS layer. The similar issue may not happen while the UE is implementing NR protocols in the Access Stratum since NR protocols support SNPN). Then, based on NR protocols, the UE would implement SNPN selection procedure firstly before the NR cell (re)selection procedure and so the NR T320 may be stopped while the UE triggers SNPN selection procedure. With the with the stop of NR T320, the UE may not implement SNPN selection and NR cell (re)selection procedure based on the stored cellReselectionPriority. In addition, the stored cellReselectionPriority may also be released with the stop of NR T320 while the UE starts/triggers the SNPN selection procedure. (5) The proposed implementation may be applicable to inter-RAT cell reselection scenario (e.g., the UE would discard the cell reselection priority information provided by the cellReselectionPriorities or inherited from another RAT. For example, while the UE receives cellReselectionPriorities in RRCConnectionRelease message transmitted by an E-UTRAN cell) while the UE is doing cell (re)selection procedure for NR cells.

Case 2: deprioritisationReq

To improve the current TS 38.331, the following may be included:

1> if deprioritisationReq is included:
  2> start or restart timer T325 with the timer value set to the deprioritisationTimer signaled;
  3> store the deprioritisationReq until T325 expiry.

In some implementations of the present disclosure, in Implementation 2, the UE may implement behaviors similar to those in Case #1 (except the T320). The counting T325 may also be stopped and/or be released with the SNPN access mode change.

Implementation 3: SuspendConfig

In Implementation 3, the impact of SNPN access mode changes on UEs in RRC inactive state is considered.

In the current 3GPP TS 38.331, Suspend Configuration, it provides:

1> if the RRCRelease includes suspendConfig:
  2> apply the received suspendConfig;
  2> if the t380 is included:
    3> start timer T380, with the timer value set to t380;
  2> if the RRCRelease message is including the waitTime:
    3> start timer T302 with the value set to the waitTime;
    3> inform upper layers that access barring is applicable for all access categories except categories '0' and '2';
  2> if T390 is running:
    3> stop timer T390 for all access categories;
    3> perform the actions as specified in 5.3.14.4;
  2> indicate the suspension of the RRC connection to upper layers;
  2> enter RRC_INACTIVE and perform cell selection as specified in TS 38.304.

In Implementation 3, in some implementations, to improve upon the current 3GPP TS 38.304, if SNPN access mode is changed, then:

(1) The UE may be requested to implement SNPN selection or PLMN selection due to the SNPN Access Mode is changed (e.g., from SNPN Access Mode de-activated to SNPN Access Mode activated and vice versa).

(2) the UE may release/stop the running cell (re)selection procedure (which is triggered after receiving RRCRelease message with suspendConfig). In some implementations, the UE may trigger an inter-RAT cell (re)selection procedure (e.g., the UE may move from a camped E-UTRA cell to camp on an NR cell due to SNPN selection request received from the NAS layer). In some other implementations, the UE may trigger an intra-RAT cell (re)selection procedure (e.g., the UE may move from a camped NR cell to camp on an NR cell due to SNPN selection request received from the NAS layer).

(3) the UE may release/stop the running RAN Notification Area Update procedure.

(4) the UE may release the stored UE Inactive AS Context (such as the ran notification area).

(5) Then, the RRC Inactive UE may transition to (NR) RRC idle state after being indicated that the SNPN access mode is changed.

(6) In addition, the UE may delete the stored suspendConfig when a PLMN selection (or SNPN selection) is performed on request by the NAS layer (e.g., due to the SNPN Access Mode is changed) or the SNPN Access Mode is changed (by the NAS layer).

(7) In addition, the counting T380/T302/T390 timer (if there is any) may also be stopped and/or be released with the SNPN Access Mode change.

(8) Moreover, in some additional implementations, the UE may need not to report the RRC Connection is release to the NAS layer.

The following implementations applicable to PLMN/SNPN shared network are provided:

the UE in RRC inactive state may not be impacted by the SNPN Access Mode change. For example, a. the counting T380/T302/T390 timer may not be stopped/released with the SNPN Access Mode change.

b. The UE may stay in RRC inactive state even the SNPN Access Mode is changed (e.g., a PLMN selection or SNPN selection is performed on request by the NAS layer). For example, the UE may stay in RRC inactive state while the UE is moving in the cellular network shared by PLMN(s) and SNPN(s). In some additional implementations, the NW may further indicate that in which SNPN(s) that the UE is authorized to stay in RRC inactive state. In some additional implementations, the NAS layer on the UE side my indicate the selected SNPN to the AS layer with further indication to request the UE to stay in RRC inactive state (while the UE is implementing cell (re)selection based on the SNPN Identity indicated by the NAS layer on the UE side).

c. In the suspendConfig, the UE may be provided with SNPN identities (and additional cellidentities associated with these SNPN identities) which the UE is allowed to select while the UE is still staying in RRC inactive state. (e.g., the cells may be shared by the PLMN(s) and SNPN(s) which the UE is allowed to access).

d. The RAN Notification Area also includes the cells or tracking area codes or ran notification area code (ranac) associated with one (or more than one) SNPN, which the UE may be authorized to access. Also note, one SNPN identifier may be composed by one PLMN identifier and one Network Identifier. In some additional embodiments, the cell identity/tracking area code/ranac associated with one (or more than one) PLMN or the cell identity/tracking area code/ranac associated with one (or more than one) SNPN may be configured jointly in one RAN Notification Area configuration to the UE through dedicated control signaling (e.g., RRCRelease message). Then, the UE may stay in RRC inactive state while the UE is moving within the given RNA. Otherwise, the UE may be initiated to implement RNA update procedure if the UE moves out of the given RNA.

e. the stored suspendConfig may still be kept on the UE side after the UE implementing SNPN selection procedure by the request of NAS layer. In some additional embodiments, part of the suspendConfig may be associated with SNPN (e.g., being associated with some specific SNPN identities or associated with the 'activated' SNPN Access Mode). So, after the SNPN Access Mode is activated, only the part of suspendConfig associated with SNPN may be kept and the other parts of suspendConfig may be released after the UE starts to implement SNPN selection procedure. It is also worthy to note that this design may also be applicable to PLMN. (e.g., part of the suspendConfig may be associated with PLMN (e.g., being associated with some specific PLMN identities or associated with the 'de-activated' SNPN Access Mode). So, after the SNPN Access Mode is de-activated, only the part of suspendConfig associated with PLMN may be kept and the other parts of suspendConfig may be released after the UE starts to implement PLMN selection procedure).

Implementation 4: TrackingAreaCode

In Implementation 4, the impact of SNPN access mode changes on tracking area update is considered.

In Implementation 4, to improve upon the current 3GPP TS 38.304, TrackingAreaCode Configuration, the following is provided:

If the cell is to be treated as if the cell status is "barred" due to being unable to acquire the SIM or due to trackingAreaCode associated with the selected (registered) PLMN/SNPN being absent in SIM as specified in TS 38.331:

The UE may exclude the barred cell as a candidate for cell selection/reselection for up to a time period (e.g., 300 seconds).

In some implementations, the stored cell barred information (and the associated counting timer to consider one cell is barred) may be released while the SNPN access mode is changed (or while the UE start to implement the PLMN selection procedure/SNPN selection procedure due to the change of SNPN access mode). In other words, the UE may reconsider to camp on these cells in the (inter-RAT/intra-RAT) cell (re)selection procedure triggered to SNPN selection procedure or PLMN selection procedure performed on-request by the NAS layer (e.g., due to SNPN access mode change).

In some implementations, the NPN identities used to define one SNPN may cover the following information elements shown in FIGS. 2A and 2B.

It should be noted that, the trackingAreaCode may be optional in the configuration. Moreover, the trackingAreaCode and/or the ranac in the NPN-identityInfoList may also be part of the RAN Notification Area for a UE (e.g., being provided to one UE through RRCRelease message or other dedicated control signaling) while SNPN(s) (or NPN(s)) is also configured as one UE's RAN Notification Area.

Implementation 5: LTE RRC State Transition

In Implementation 5, the impact of SNPN access mode changes on UEs with regard to LTE RRC state transition is considered. For example, an SNPN enabled UE may stay in LTE RRC Idle (or LTE RRC inactive state) (e.g., while the SNPN access mode is de-activated).

In some implementations of the present disclosure, to the SNPN enabled UE, the UE may transition from the LTE RRC Inactive(/Idle) state to NR idle state while the SNPN access mode is activated (e.g., by the upper layer).

In some implementations of the present disclosure, from the AS layer point of view, a UE in LTE RRC Inactive/Idle state may transit to NR RRC Idle state automatically while the UE is requested by the NAS layer to implement SNPN selection.

In some implementations of the present disclosure, a UE in LTE RRC inactive state may transit to NR RRC inactive state while the UE is requested by the NAS layer to implement SNPN selection. In addition, the stored SuspendConfig may still be valid after the RRC inactive state transitions. In some implementations, the UE may also inherit the timers (e.g., T302 or T380 or T390 in LTE protocols) during the inter-RAT RRC state transitions. (also note, in some additional embodiments, the stored SuspendConfig may be released in such inter-RAT RRC state transition case and the active timers while the UE is staying in LTE RRC inactive state may be stopped/released after the UE transitioning to NR RRC inactive state.)

In some implementations, SNPN may also be supported in E-UTRA. Therefore, one UE in NR RRC inactive state may transit to LTE RRC inactive state while the UE is requested by the NAS layer to implement SNPN selection. In addition, the stored SuspendConfig may still be valid after the RRC inactive state transitions. In some additional embodiments, UE may also inherit the timers (e.g., T302 or T380 or T390 in NR protocols) during the inter-RAT RRC state transitions. (also note, in some additional embodiments, the stored SuspendConfig may be released in such inter-RAT RRC state transition case and the active timers while the UE is staying in NR RRC inactive state may be stopped/released after the UE transitioning to LTE RRC inactive state.)

Implementation 6: Shared Network

In the current 3GPP TS 24.501, it is observed that cell(s) of a shared network may broadcast the following information (e.g., through system information delivery):

1) one or more TACs (Tracking Area Code); and
2) any of the following:
   i) one or multiple PLMN identities;
   ii) one or multiple SNPN identities (also note, in some implementations, one PLMN ID may be composed by PLMN identifier and one NID (e.g., Network Identifier)); or
   iii) one or more PLMN identities and one or more SNPN identities.

In Implementation 6, for an SNPN enabled UE, the UE may apply the PLMN identity list/SNPN identity list which the UE receives from the serving cell (while the serving cell) as part of stored information while the SNPN access mode is changed. For example, while the SNPN access mode is de-activated from SNPN access mode activated state (and so the UE receives one or more SNPN selection request(s) from the NAS layer), the UE may monitor and/or camp on a cell which broadcasts one or more PLMN identities and one or more SNPN identities. Then, the UE may record the SNPN identity list broadcast by those cell(s) of the shared network. On the other hand, while the SNPN access mode is activated, the UE may monitor and/or camp on a cell which broadcasts one or more PLMN identities and one or more SNPN identities. Then, the UE may record the PLMN identity list broadcast by those cell(s) of shared network. Then, if the SNPN access mode is changed, the stored information may be applied to facilitate the following PLMN/SNPN selection procedure (and cell (re)selection procedures). In other words, the stored SNPN identity list and/or PLMN identity list (associated with the cells which the UE used to camp) would not be released by the SNPN access mode change. In some additional implementations, the UE may store the NW identities (e.g., SNPN identity and/or PLMN identity) which the UE has selected/registered/accessed as part of UE stored information on the UE side. In addition, the stored NW identities may not be impacted by the SNPN access mode change. For examples, the UE may have stored SNPN identities that the UE has selected/access/registered while the SNPN access mode is activated. Then, the UE may still keep the stored SNPN identities after the SNPN access mode is de-activated (and so the AS layer of the UE side may receive one or more PLMN selection request(s) from the NAS layer while the SNPN access mode is de-activated). Then, the next time that the SNPN access mode is activated again (and so the AS layer of the UE side may receive one or more PLMN selection request(s) from the NAS layer while the SNPN access mode is activated), the UE may be able to implement SNPN selection (and the following cell (re)selection procedure) by using the stored SNPN identities.

In some other implementations, the UE may have stored PLMN identities that the UE has selected/access/registered while the SNPN access mode is de-activated. Then, the UE may still keep the stored PLMN identities after the SNPN access mode is activated (and so the AS layer of the UE side may receive one or more SNPN selection request(s) from the NAS layer while the SNPN access mode is activated). Then, the next time that the SNPN access mode is de-activated again (and so the AS layer of the UE side may receive one or more PLMN selection request(s) from the NAS layer while the SNPN access mode is de-activated), the UE may be able to implement PLMN selection (and the following cell (re)selection procedure) by using the stored PLMN identities.

Figure 3A:
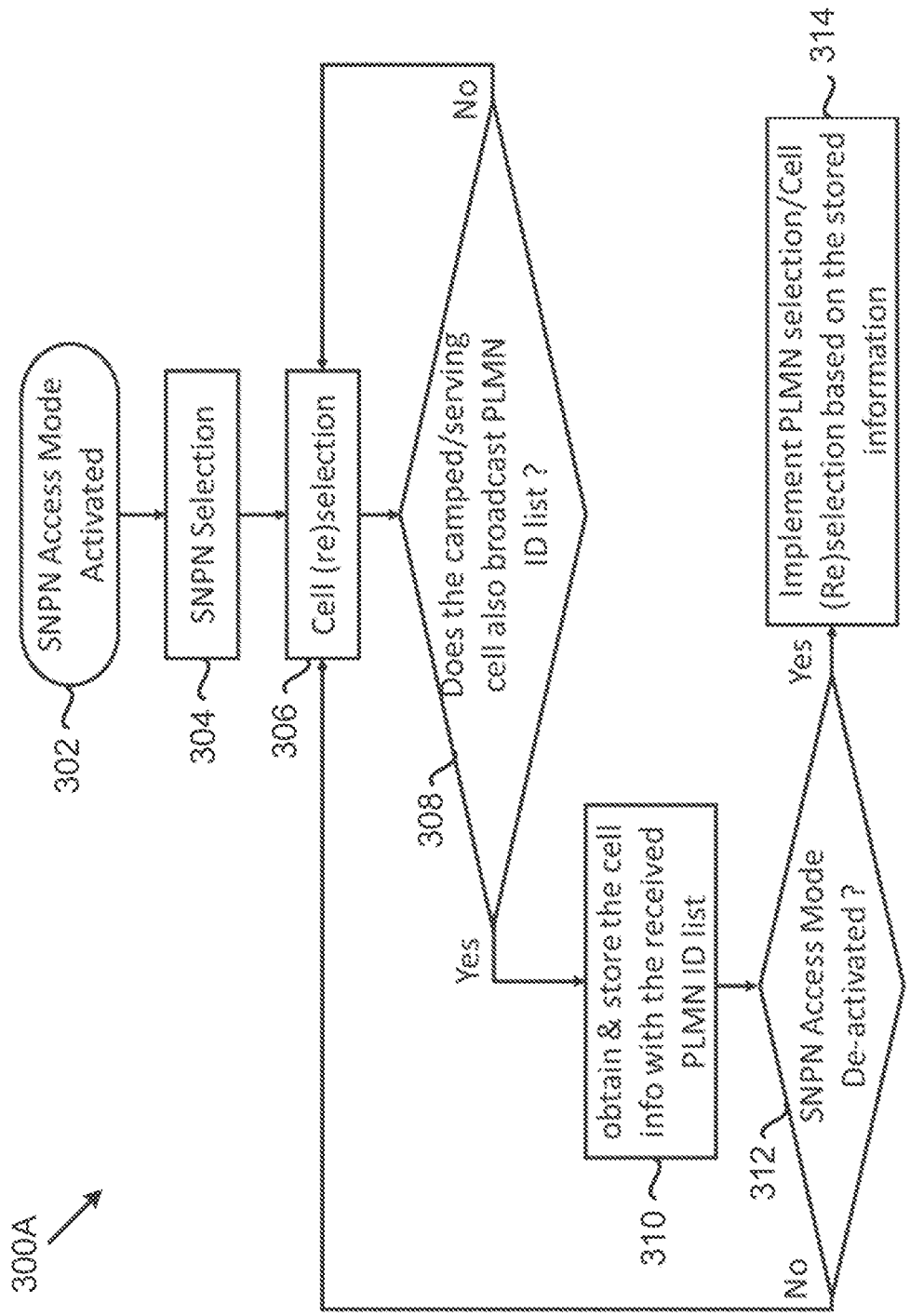
FIG. 3A is a flowchart illustrating a method by an SNPN enable UE to record a PLMN identify list when the SNPN access mode is activated, in accordance with an example implementation of the present disclosure.

FIG. 3A is a flowchart 300A illustrating a method by an SNPN enable UE to record a PLMN identify list when the SNPN access mode is activated, in accordance with an example implementation of the present disclosure.

In action 302, the UE may have an SNPN access mode activated.

In action 304, the UE may perform an SNPN selection.

In action 306, the UE may initiate a cell (re)selection.

In action 308, the UE may determine whether the camped or serving cell also broadcasts a PLMN ID list. If the camped or serving cell does not broadcast a PLMN ID list, the flowchart 300A proceeds from action 308 to action 306. If the camped or serving cell broadcasts a PLMN ID list, the flowchart 300A proceeds from action 308 to action 310.

In action 310, the UE may obtain and store the cell information with the received PLMN ID list.

In action 312, the UE may determine whether an SNPN access mode is deactivated. If the SNPN access mode is not deactivated, the flowchart 300A proceeds from action 312 to action 306. If the SNPN access mode is deactivated, the flowchart 300A proceeds from action 312 to action 314.

In action 314, the UE may implement PLMN selection or cell (re)selection based on the stored information.

Figure 3B:
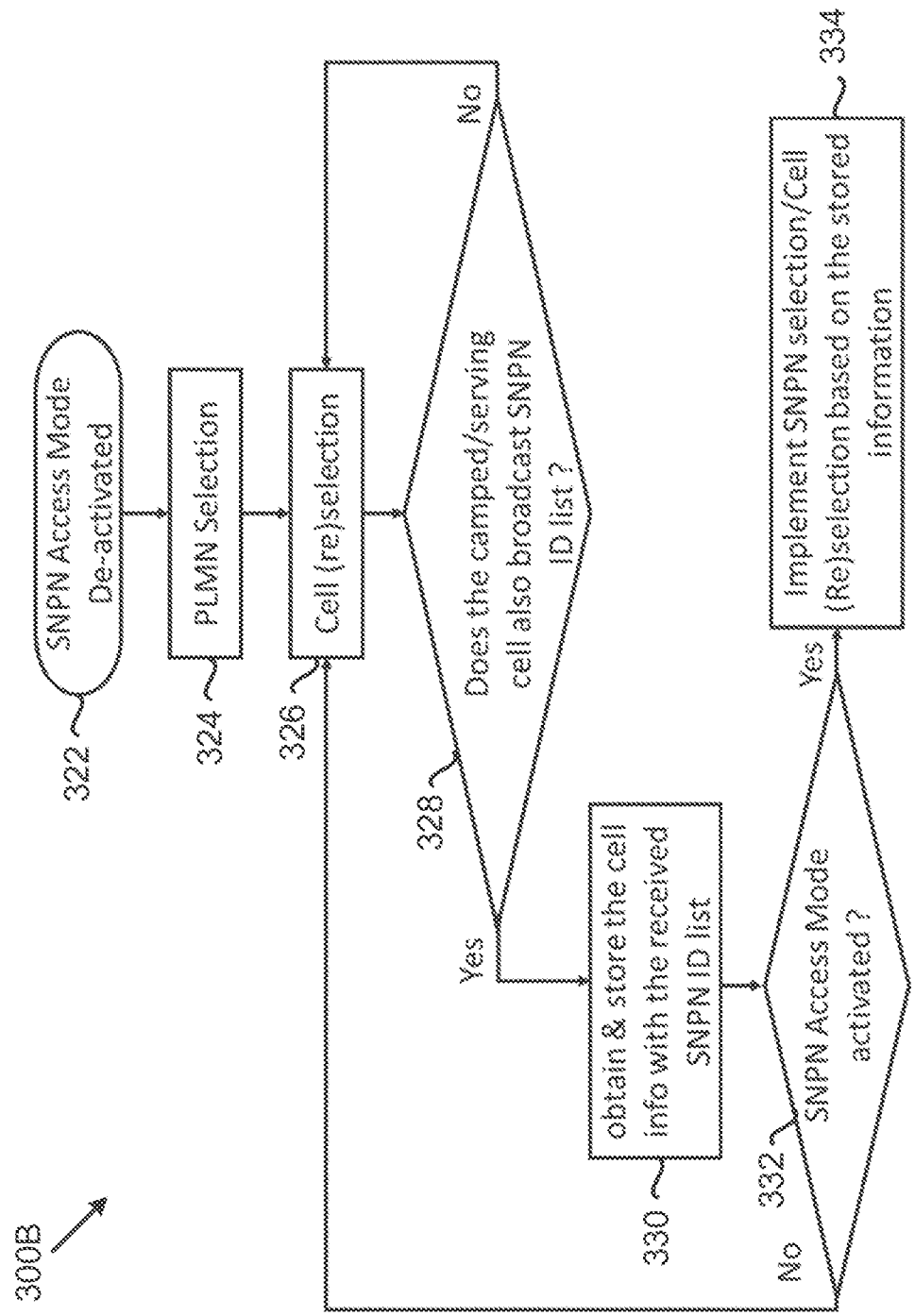
FIG. 3B is a flowchart illustrating a method by an SNPN enable UE to record an SNPN identify list when the SNPN access mode is de-activated, in accordance with an example implementation of the present disclosure.

FIG. 3B is a flowchart 300B illustrating a method by an SNPN enable UE to record an SNPN identify list when the SNPN access mode is de-activated.

In action 322, the UE may have an SNPN access mode de-activated.

In action 324, the UE may perform a PLMN selection.

In action 326, the UE may initiate a cell (re)selection.

In action 328, the UE may determine whether the camped or serving cell also broadcasts an SNPN ID list. If the camped or serving cell does not broadcast an SNPN ID list, the flowchart 300B proceeds from action 328 to action 326. If the camped or serving cell broadcasts an SNPN ID list, the flowchart 300B proceeds from action 328 to action 330.

In action 330, the UE may obtain and store the cell information with the received SNPN ID list.

In action 332, the UE may determine whether an SNPN access mode is activated. If the SNPN access mode is not activated, the flowchart 300B proceeds from action 332 to action 326. If the SNPN access mode is activated, the flowchart 300B proceeds from action 332 to action 334.

In action 334, the UE may implement SNPN selection or cell (re)selection based on the stored information.

It is noted that in some implementations, to an SNPN enabled UE of which the SNPN access mode is activated/de-activated, the UE may also record the received PLMN identity list from the monitoring results without regard to whether the monitored cell supports any SNPN or not. In contrast, an SNPN de-activated UE may also record the received SNPN identity list from the monitoring results without regarding to whether the monitored cell supports any PLMN or not. Then, if the SNPN access mode is changed, the stored information may be applied to facilitate the following PLMN/SNPN selection procedure (and cell (re)selection procedures).

The present disclosure provides several implementations for a UE to implement PLMN/SNPN selection and cell (re)selection procedure by considering the impact of SNPN and SNPN access mode change. It should be noted that the implementations discussed above may also be applicable to PNI-NPNs.

FIG. 4 illustrates a flowchart 400 of a method performed by a UE in accordance with an example implementation of the present disclosure.

In action 402, a UE may receive at least one of cell (re)selection priorities (cellReselectionPriorities) and deprioritization requests (depriornisationReqs) through E-UTRA dedicated signaling (e.g., E-UTRA RRCRelease message) to instruct a UE to move from an E-UTRA RRC Connected state to an E-UTRA/NR RRC Inactive state or an E-UTRA/NR RRC Idle state. In some implementations, the E-UTRA dedicated signaling (e.g., E-UTRA RRCRelease message) may also instruct a UE to move from an E-UTRA RRC Inactive state to an E-UTRA/NR RRC Inactive state or an E-UTRA/NR RRC Idle state. In addition, with the reception of at least one of cell (re)selection priorities (cellReselectionPriorities) (if there is any in the E-UTRA dedicated signaling), one initial value t320 may also be configured to instruct the UE to start a (LTE) T320 counting procedure by setting the initial value of (LTE) T320=t320. In contrast, with the reception of at least one of deprioritization requests (depriornisationReqs) (if there is any in the E-UTRA dedicated signaling), one value initial value 'deprioritisation-Timer' may be configured to instruct the UE to start a (LTE) T325 counting procedure by setting the initial value of T325=deprioritisationTimer'.

In action 404, the UE may receive at least one of cell (re)selection priorities (cellReselectionPriorities) and/or deprioritization requests (deprioritisationReqs) through NR dedicated signaling (e.g., NR RRCRelease message) to instruct the UE to move from an NR radio resource control (RRC) Connected state to an E-UTRA/NR RRC Inactive state or an E-UTRA/NR RRC Idle state. In some additional implementations, the NR dedicated signaling (e.g., NR RRCRelease message) may also instruct a UE to move from an NR RRC Inactive state to an E-UTRA/NR RRC Inactive state or an E-UTRA/NR RRC Idle state. In addition, with the reception of at least one of cell (re)selection priorities (cellReselectionPriorities) (if there is any in the NR dedicated signaling), one initial value t320 may also be configured to instruct the UE to start a (NR) T320 counting procedure by setting the initial value of (NR) T320=t320. In contrast, with the reception of at least one of deprioritization requests (deprioritisationReqs) (if there is any in the NR dedicated signaling), one value initial value 'deprioritisationTimer' may be configured to instruct the UE to start a (NR) T325 counting procedure by setting the initial value of (NR) T325='deprioritisationTimer'.

In action 406, the UE may receive one of an SNPN selection request and a PLMN selection request, while the UE has stored the at least one of cellReselectionPriorities and deprioritisationReqs. In one implementation, the one of the SNPN selection request and the PLMN selection request is received from the NAS layer of the UE when the NAS layer moves to an SNPN access mode or when the NAS layer moves out of SNPN access mode.

In action 408, the UE may delete the stored at least one of cellReselectionPriorities and deprioritisationReqs when an SNPN selection in response to the SNPN selection request or a PLMN selection in response to the PLMN selection request is performed by the UE.

In action 410, the UE may stop a running (LTE/NR) T320 timer (which is configured to be associated with the at least one of cell (re)selection priorities (cellReselectionPriorities) if there is any) in response to receiving the SNPN selection request or the PLMN selection request. In some implementations, the UE may stop a running (LTE/NR) T325 timer (which is configured to be associated with the at least one of deprioritization requests (deprioritisationReqs) if there is any) in response to receiving the SNPN selection request or the PLMN selection request.

In action 412, the UE may apply a PLMN identity list or an SNPN identity list received from a serving cell as part of stored information while the SNPN access mode is changed.

FIG. 5 illustrates a flowchart 500 of a method performed by a UE in accordance with an example implementation of the present disclosure.

In action 502, a UE may store redirected carrier information (redirectedCarrierInfo) after receiving a radio resource control (RRC) release (RRCRelease message) message containing the redirectedCarrierInfo.

In action 504, the UE may perform an SNPN selection in response to the SNPN selection request or a PLMN selection in response to the PLMN selection request.

In action 506, the UE may perform at least one of the following: abort or stop a cell selection procedure that is triggered after receiving the RRCRelease message having the redirectedCarrierInfo indicating redirection to an Evolved Universal Terrestrial Radio Access (E-UTRA) cell; and remove the stored redirectedCarrierInfo.

Figure 6:
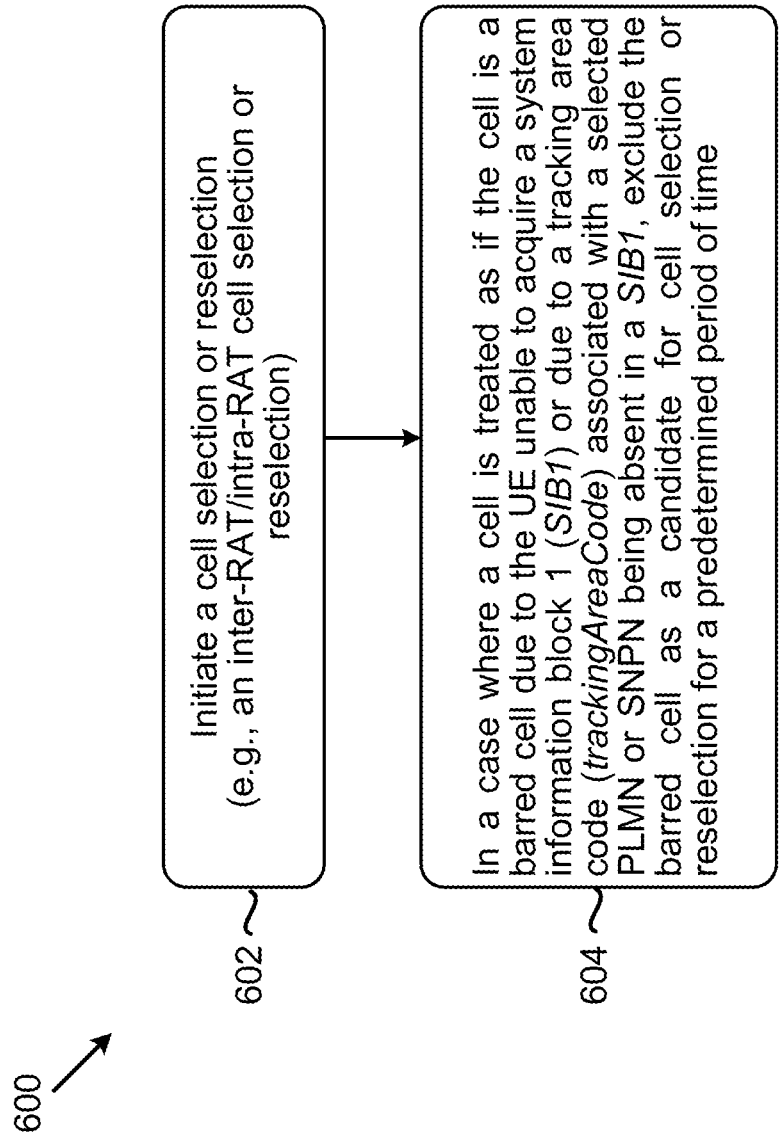
FIG. 6 illustrates a flowchart of a method performed by a UE, in accordance with an example implementation of the present disclosure.

FIG. 6 illustrates a flowchart 600 of a method performed by a UE in accordance with an example implementation of the present disclosure.

In action 602, a UE may initiate a cell selection or reselection (e.g., an inter-RAT/intra-RAT cell selection or reselection).

In action 604, in a case where a cell is treated as if the cell is a barred cell due to the UE unable to acquire a system information block 1 (SIB1) or due to a tracking area code (trackingAreaCode) associated with a selected PLMN or SNPN being absent in a SIB1, the UE may exclude the barred cell as a candidate for cell selection or reselection for a pre-determined period of time.

Figure 7:
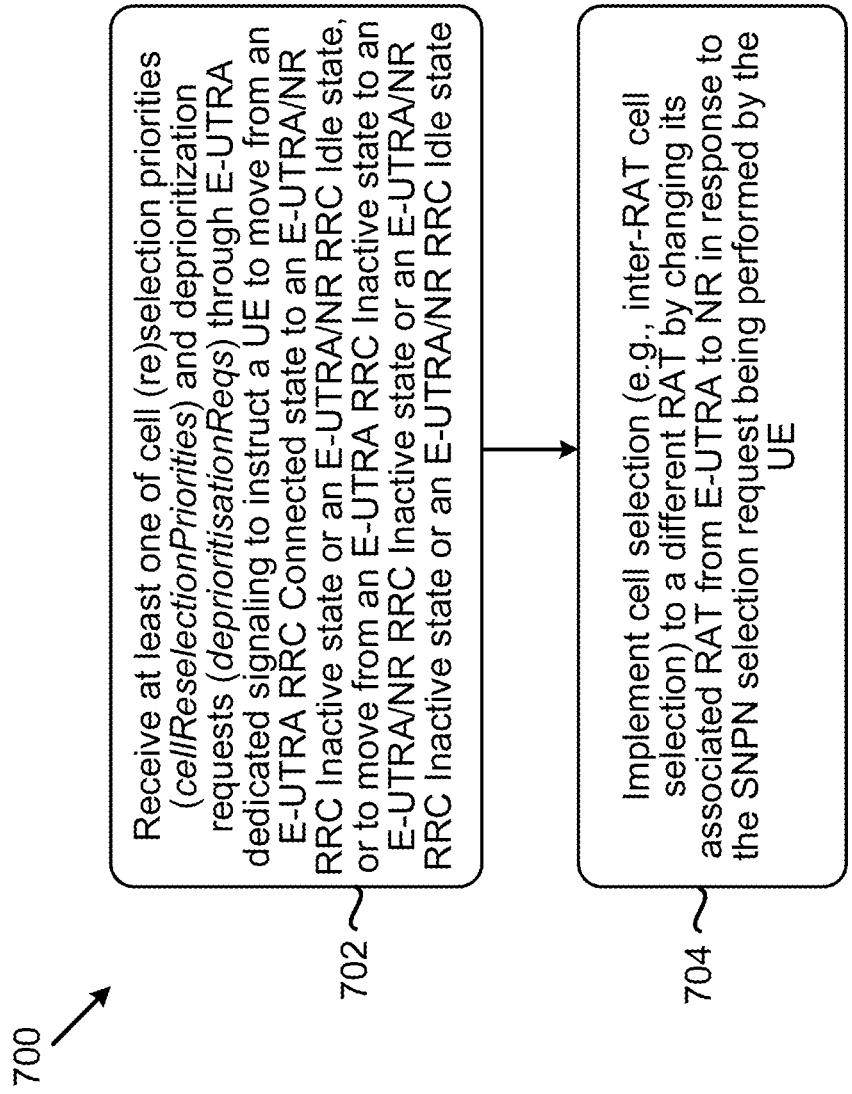
FIG. 7 illustrates a flowchart of a method performed by a UE, in accordance with an example implementation of the present disclosure.

FIG. 7 illustrates a flowchart 700 of a method performed by a UE in accordance with an example implementation of the present disclosure.

In action 702, a UE may receive at least one of cell (re)selection priorities (cellReselectionPriorities) and deprioritization requests (deprioritisationReqs) through E-UTRA dedicated signaling (e.g., E-UTRA RRCRelease message) to instruct a UE to move from an E-UTRA RRC Connected state to an E-UTRA/NR RRC Inactive state or an E-UTRA/NR RRC Idle state. In some implementations, the E-UTRA dedicated signaling (e.g., E-UTRA RRCRelease message) may also instruct the UE to move from an E-UTRA RRC Inactive state to an E-UTRA/NR RRC Inactive state or an E-UTRA/NR RRC Idle state.

In action 704, the UE may implement (inter-RAT) cell selection to a different radio access technology (RAT) by changing its associated RAT from Evolved Universal Terrestrial Radio Access (E-UTRA) to New Radio (NR) in response to the SNPN selection request being performed by the UE.

Figure 8:
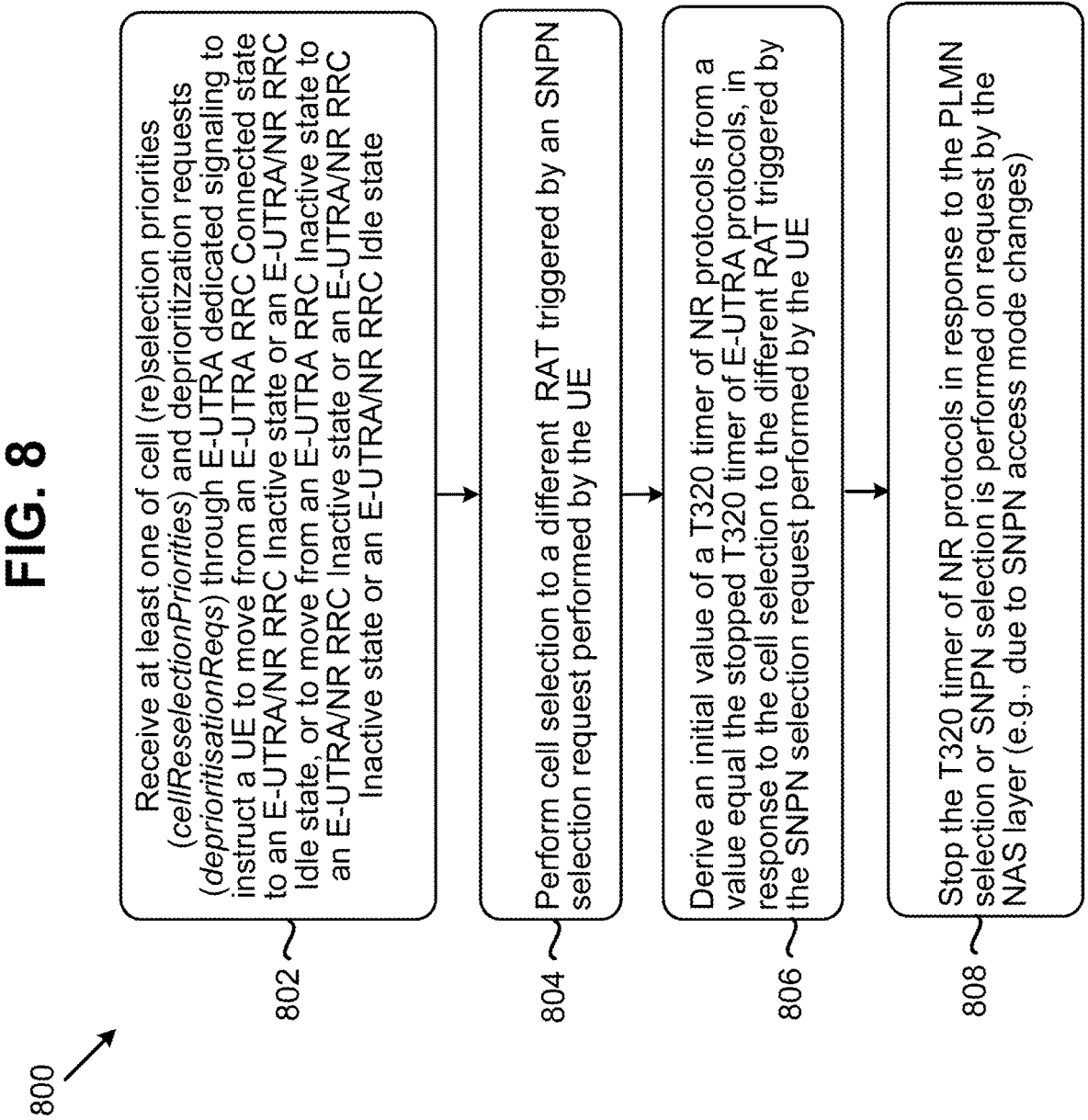
FIG. 8 illustrates a flowchart of a method performed by a UE, in accordance with an example implementation of the present disclosure.

FIG. 8 illustrates a flowchart 800 of a method performed by a UE in accordance with an example implementation of the present disclosure.

In action 802, a UE may receive at least one of cell (re)selection priorities (cellReselectionPriorities) and deprioritization requests (deprioritisationReqs) through E-UTRA dedicated signaling (e.g., E-UTRA RRCRelease message) to instruct a UE to move from an E-UTRA RRC Connected state to an E-UTRA/NR RRC Inactive state or an E-UTRA/NR RRC Idle state. In some implementations, the E-UTRA dedicated signaling (e.g., E-UTRA RRCRelease message) may also instruct the UE to move from an E-UTRA RRC Inactive state to an E-UTRA/NR RRC Inactive state or an E-UTRA/NR RRC Idle state. In addition, with the reception of at least one of cell (re)selection priorities (cellReselectionPriorities) (if there is any in the E-UTRA dedicated signaling), the UE may also receive one configured value of T320 in the E-UTRA dedicated signaling to configure the initial value of (LTE) T320 of E-UTRA protocols. In addition, after RRC state transitions, the UE may also start to count T320 (of E-UTRA protocols) to zero by setting the initial value of T320 as the t320 value received in the E-UTRA dedicated signaling. The UE may keep counting the T320 (of E-UTRA protocols) while the UE is staying in E-UTRA RRC Inactive/Idle state.

In action 804, the UE may perform cell selection to a different RAT triggered by an SNPN selection request performed by the UE. In addition, the counting T320 (E-UTRA protocols) may also be stopped while the UE implements inter-RAT (e.g., from E-UTRA to NR) cell (re)selection procedure.

In action 806, the UE may derive an initial value of a T320 timer of NR protocols from a value equal the stopped T320 timer of E-UTRA protocols, in response to the cell selection to the different RAT triggered by the SNPN selection request performed by the UE.

In action 808, the T320 timer of NR protocols may be stopped in response to the PLMN selection or SNPN selection is performed on request by the NAS layer (e.g., due to SNPN access mode changes). Also in action 808, the UE may delete the stored at least one of cellReselectionPriorities and/or deprioritisationReqs when an SNPN selection in response to the SNPN selection request or a PLMN selection in response to the PLMN selection request is performed by the UE.

It is also noted that the UE implementations for the T320 in FIG. 8 may also be applicable to the T325 (of E-UTRA protocols) while one initial T325 value is provided to the UE along with the deprioritization requests (deprioritisationReqs) in the E-UTRA dedicated signaling and the UE triggers inter-RAT cell (re)selection procedure (e.g., from E-UTRA to NR) after the reception of E-UTRA dedicated signaling. In this condition, with the reception of the deprioritization requests (deprioritisationReqs), one value initial value 'deprioritisationTimer' may be configured to instruct the UE to start a (LTE) T325 counting procedure by setting the initial value of T325='deprioritisationTimer'.

It is further noted that the UE implementations for the T320 (E-UTRA protocols) in FIG. 8 may also be applicable to the T320 (of NR protocols) after one initial T320 value is provided to the UE along with the at least one of cell (re)selection priorities (cellReselectionPriorities) in the NR dedicated signaling and the UE triggers inter-RAT cell (re)selection procedure (e.g., from NR to E-UTRA) after the reception of E-UTRA dedicated signaling.

Figure 9:
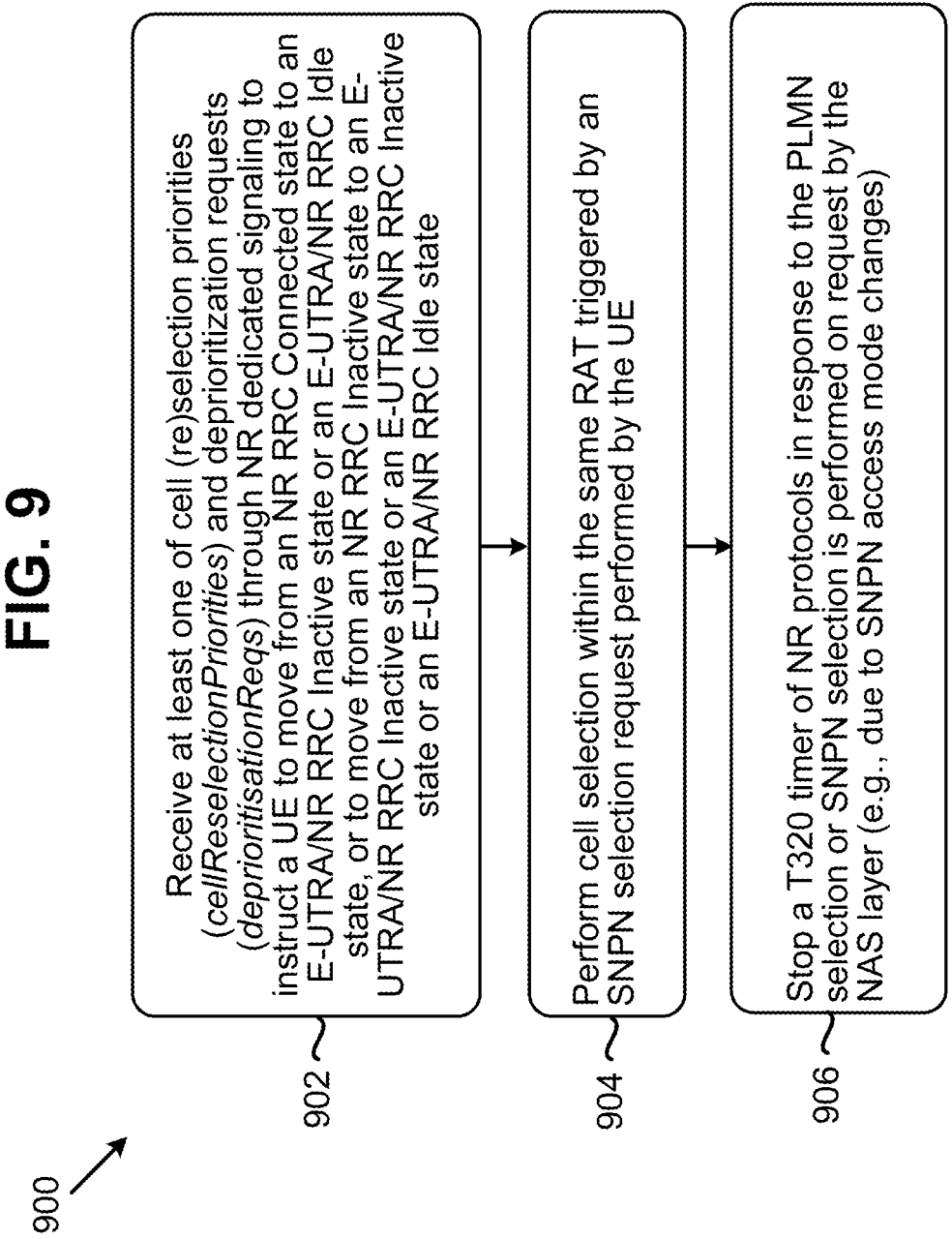
FIG. 9 illustrates a flowchart of a method performed by a UE, in accordance with an example implementation of the present disclosure.

FIG. 9 illustrates a flowchart 900 of a method performed by a UE in accordance with an example implementation of the present disclosure.

In action 902, a UE may receive at least one of cell (re)selection priorities (cellReselectionPriorities) and deprioritization requests (deprioritisationReqs) through NR dedicated signaling (e.g., NR RRCRelease message) to instruct a UE to move from an NR RRC Connected state to an E-UTRA/NR RRC Inactive state or an E-UTRA/NR RRC Idle state. In some implementations, the NR dedicated signaling (e.g., E-UTRA RRCRelease message) may also instruct the UE to move from an NR RRC Inactive state to an E-UTRA/NR RRC Inactive state or an E-UTRA/NR RRC Idle state. In addition, with the reception of at least one of cell (re)selection priorities (cellReselectionPriorities) from the NR dedicated signaling (if there is any), UE may also receive one configured value of t320 in the NR dedicated signaling to configure the initial value of T320 of NR protocols. In addition, after RRC state transitions, the UE may also start to count T320 (of NR protocols) to zero by setting the initial value of T320 as the t320 value received in the NR dedicated signaling. The UE may keep counting the T320 (of NR protocols) while the UE is staying in NR RRC Inactive/Idle state.

In action 904, the UE may perform cell selection within the same RAT (e.g., cell (re)selection procedure triggered by an SNPN selection request performed by the UE). In addition, the counting T320 (NR protocols) may be stopped when PLMN selection or SNPN selection is performed on request by the NAS layer.

In action 906, a running T320 timer of NR protocols may be stopped in response to the PLMN selection or SNPN selection is performed on request by the NAS layer (e.g., due to SNPN access mode changes). Also, in action 906, the UE may delete the stored at least one of cellReselectionPriorities and/or deprioritisationReqs when an SNPN selection in response to the SNPN selection request or a PLMN selection in response to the PLMN selection request is performed by the UE.

It should be noted that the UE implementations for the T320 in FIG. 9 may also be applicable to the T325 (of NR protocols) while the T325 is provided to the UE along with deprioritization requests (deprioritisationReqs) in the NR dedicated signaling and the UE triggers intra-RAT cell (re)selection procedure (e.g., NR cell (re)selection procedure) after the reception of NR dedicated signaling.

It should be also noted that the UE implementations for the T320 (NR protocols) in FIG. 9 may also be applicable to the T320 (of E-UTRA protocols) after one initial t320 value is provided to the UE along with the at least one of cell (re)selection priorities (cellReselectionPriorities) in the E-UTRA dedicated signaling and the UE triggers intra-RAT cell (re)selection procedure (e.g., E-UTRA cell (re)selection procedure) after the reception of NR dedicated signaling.

Figure 10:
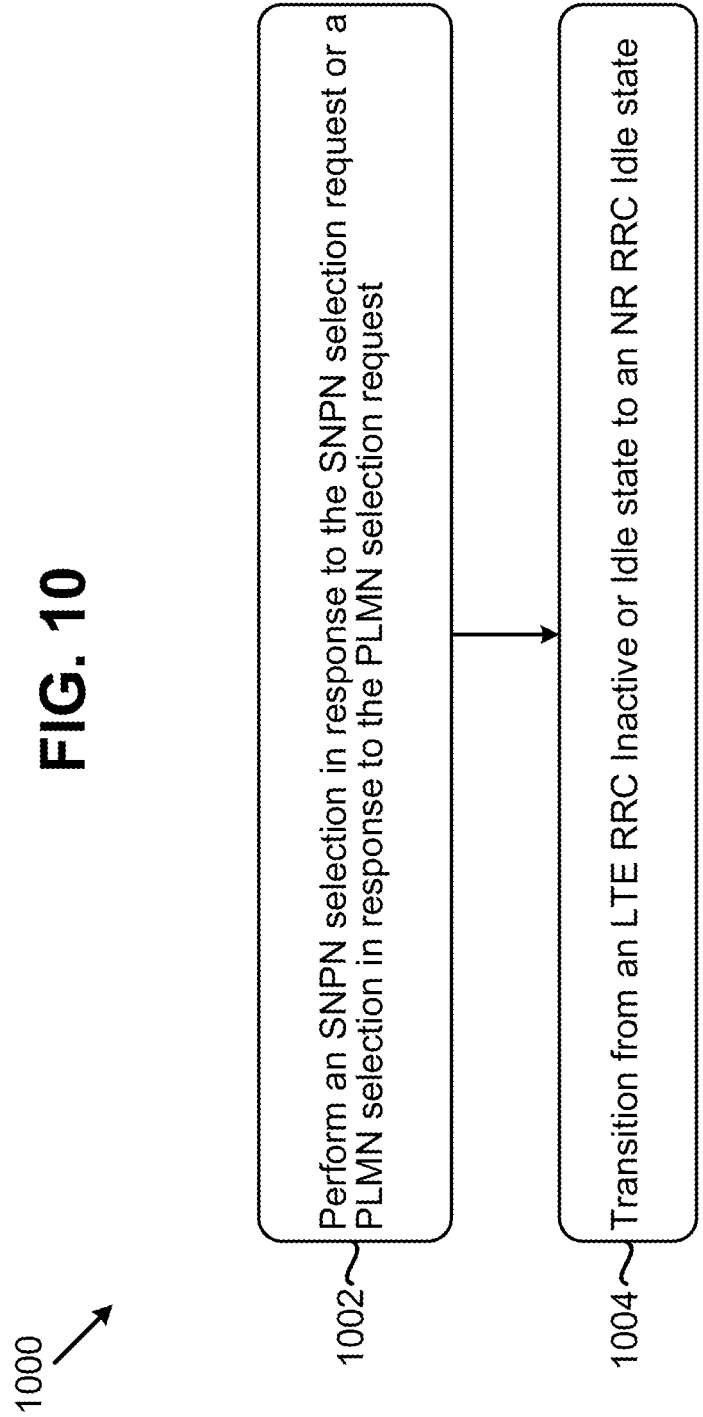
FIG. 10 illustrates a flowchart of a method performed by a UE, in accordance with an example implementation of the present disclosure.

FIG. 10 illustrates a flowchart 1000 of a method performed by a UE in accordance with an example implementation of the present disclosure.

In action 1002, a UE may perform an SNPN selection in response to the SNPN selection request or a PLMN selection in response to the PLMN selection request.

In action 1004, the UE may transition from an LTE RRC Inactive or Idle state to an NR RRC Idle state.

Figure 11:
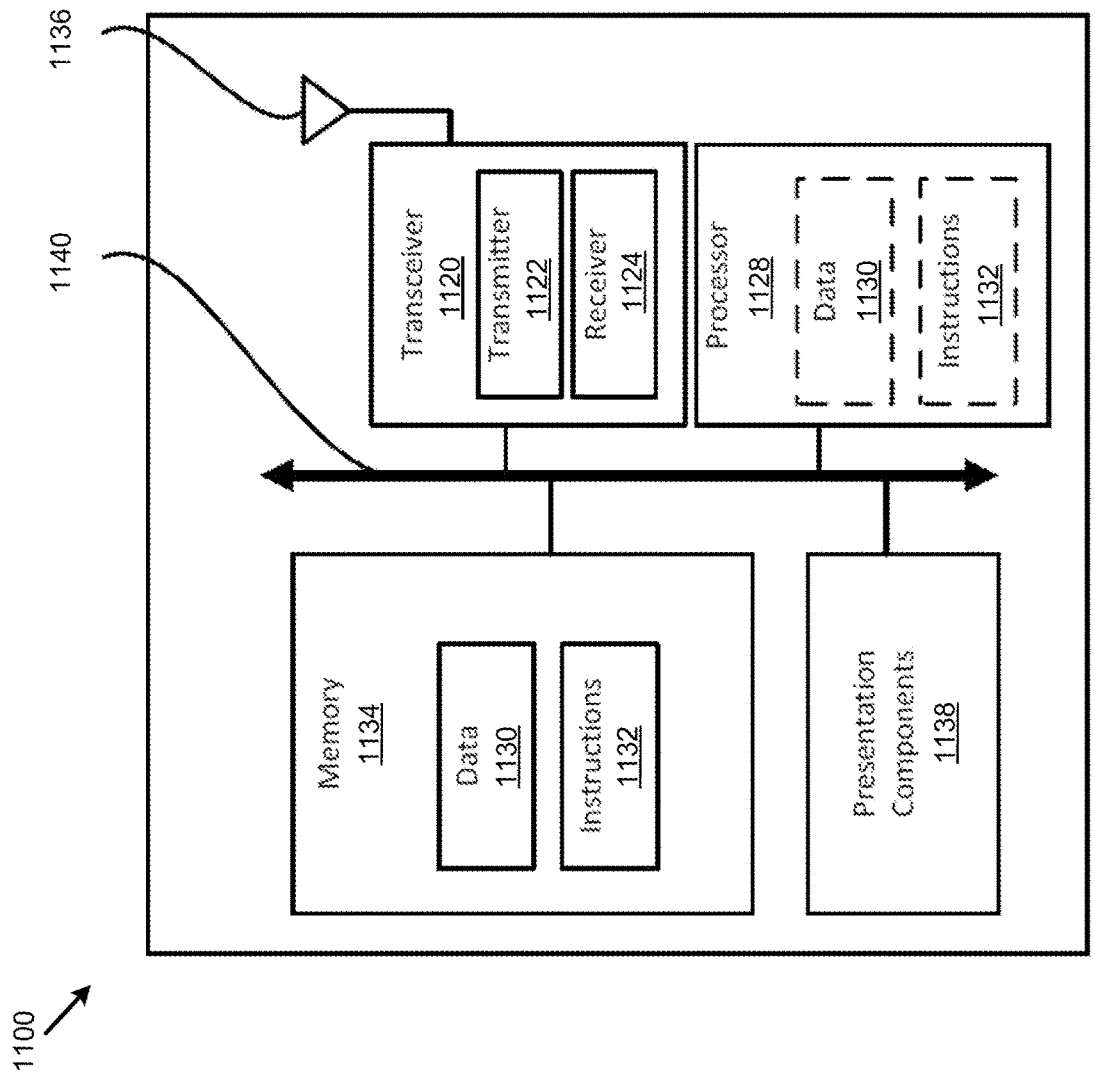
FIG. 11 illustrates a block diagram of a node for wireless communication, in accordance with an example implementation of the present disclosure.

FIG. 11 illustrates a block diagram of a node 1100 for wireless communication according to an implementation of the present disclosure. As illustrated in FIG. 11, the node 1100 may include a transceiver 1106, a processor 1108, a memory 1102, one or more presentation components 1104, and at least one antenna 1110. The node 1100 may also include a radio frequency (RF) spectrum band module, a BS communications module, a network communications module, and a system communications management module, Input/Output (I/O) ports, I/O components, and a power supply (not explicitly illustrated in FIG. 11).

Each of these components may be in communication with each other, directly or indirectly, over one or more buses 1124. The node 1100 may be a UE or a BS that performs various functions described herein, for example, with reference to FIGS. 1 through 10.

The transceiver 1106 having a transmitter 1116 (e.g., transmitting/transmission circuitry) and a receiver 1118 (e.g., receiving/reception circuitry) may be configured to transmit and/or receive time and/or frequency resource partitioning information. The transceiver 1106 may be configured to transmit in different types of subframes and slots, including, but not limited to, usable, non-usable and flexibly usable subframes and slot formats. The transceiver 1106 may be configured to receive data and control channels.

The node 1100 may include a variety of computer-readable media. Computer-readable media can be any available media that can be accessed by the node 1100 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the previously disclosed communication media should also be included within the scope of computer-readable media.

The memory 1102 may include computer storage media in the form of volatile and/or non-volatile memory. The memory 1102 may be removable, non-removable, or a combination thereof. For example, the memory 1102 may include solid-state memory, hard drives, optical-disc drives, etc. As illustrated in FIG. 11, the memory 1102 may store computer-readable and/or computer-executable instructions 1114 (e.g., software code(s) or computer-executable program(s)) that are configured to, when executed, cause the processor 1108 to perform various functions described herein, for example, with reference to FIGS. 1 through 10. Alternatively, the instructions 1114 may not be directly executable by the processor 1108 but may be configured to cause the node 1100 (e.g., when compiled and executed) to perform various functions described herein.

The processor 1108 (e.g., having processing circuitry) may include an intelligent hardware device, a Central Processing Unit (CPU), a microcontroller, an ASIC, etc. The processor 1108 may include memory. The processor 1108 may process the data 1112 and the instructions 1114 received from the memory 1102, and information through the transceiver 1106, the baseband communications module, and/or the network communications module. The processor 1108 may also process information to be sent to the transceiver 1106 for transmission through the antenna 1110, to the network communications module for transmission to a CN.

One or more presentation components 1104 may present data indications to a person or other devices. Examples of presentation components 1104 may include a display device, speaker, printing component, vibrating component, etc.

From the present disclosure, it is manifested that various techniques may be used for implementing the concepts described in the present application without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A user equipment (UE), comprising:
one or more non-transitory computer-readable media storing computer-executable instructions; and
at least one processor coupled to the one or more non-transitory computer-readable media and configured to execute the computer-executable instructions to cause the UE to:
receive, at an access stratum (AS) layer of the UE from a non-access stratum (NAS) layer of the UE, a stand-alone non-public network (SNPN) selection request when the NAS layer moves into an SNPN access mode or when the NAS layer remains in the SNPN access mode;
delete priorities provided by dedicated signaling when an SNPN selection in response to the SNPN selection request is performed by the UE; and
stop a T320 timer in response to receiving the SNPN selection request.

2. The UE of claim 1, wherein the priorities provided by the dedicated signaling are is received through Evolved Universal Terrestrial Radio Access (E-UTRA) dedicated signaling to instruct the UE to move to an E-UTRA or New Radio (NR) (E-UTRA/NR) radio resource control (RRC) Inactive state or an E-UTRA/NR RRC Idle state.

3. The UE of claim 2, wherein the at least one processor is further configured to execute the computer-executable instructions to cause the UE to:
configure an initial value for the T320 timer upon reception of a t320 value within the E-UTRA dedicated signaling or based on a remaining validity time inherited from E-UTRA protocols upon cell (re)selection to NR from E-UTRA while an inter-radio access technology (inter-RAT) (re)selection procedure is triggered.

4. The UE of claim 1, wherein the priorities provided by the dedicated signaling are received through New Radio (NR) dedicated signaling to instruct the UE to move to an E-UTRA/NR RRC Inactive state or an E-UTRA/NR RRC Idle state.

5. The UE of claim 4, wherein the at least one processor is further configured to execute the computer-executable instructions to cause the UE to:
configure an initial value for the T320 timer upon reception of a t320 value within the NR dedicated signaling or based on a remaining validity time inherited from E-UTRA protocols upon cell (re)selection to NR from E-UTRA while an inter-radio access technology (inter-RAT) (re)selection procedure is triggered.

6. The UE of claim 1, wherein the at least one processor is further configured to execute the computer-executable instructions to cause the UE to:
implement a cell selection in a different radio access technology (RAT) by changing a RAT associated with the UE from E-UTRA to NR in response to the SNPN selection request being performed by the UE.

7. The UE of claim 1, wherein the at least one processor is further configured to execute the computer-executable instructions to cause the UE to:
store redirected carrier information (redirectedCarrierInfo) after receiving a radio resource control (RRC) release (RRCRelease) message having the redirectedCarrierInfo; and
after performing the SNPN selection in response to receiving the SNPN selection request, perform at least one of the following:
abort or stop a cell selection procedure that is triggered after receiving the RRCRelease message having the redirectedCarrierInfo when the redirectedCarrierInfo indicates redirection to an Evolved Universal Terrestrial Radio Access (E-UTRA) cell; or remove the stored redirectedCarrierInfo.

8. The UE of claim 1, wherein the at least one processor is further configured to execute the computer-executable instructions to cause the UE to:

reconsider a cell as "not barred" after receiving the SNPN selection request if the cell is previously considered as "barred" by the UE.

9. The UE of claim 1, wherein the at least one processor is further configured to execute the computer-executable instructions to cause the UE to:

apply at least one of a stored PLMN identity list and an SNPN identity list received from a serving cell as part of stored information without being impacted by SNPN access mode changes.

10. A method performed by a user equipment (UE), the method comprising:

receiving, at an access stratum (AS) layer of the UE from a non-access stratum (NAS) layer of the UE, a stand-alone non-public network (SNPN) selection request when the NAS layer moves into an SNPN access mode or when the NAS layer remains in the SNPN access mode;

deleting priorities provided by dedicated signaling when an SNPN selection in response to the SNPN selection request is performed by the UE; and stopping a T320 timer in response to receiving the SNPN selection request.

11. The method of claim 10, wherein the priorities provided by the dedicated signaling are received through Evolved Universal Terrestrial Radio Access (E-UTRA) dedicated signaling to instruct the UE to move to an E-UTRA or New Radio (NR) (E-UTRA/NR) radio resource control (RRC) Inactive state or an E-UTRA/NR RRC Idle state.

12. The method of claim 11, further comprising:

configuring an initial value for the T320 timer upon reception of a t320 value within the E-UTRA dedicated signaling or based on a remaining validity time inherited from E-UTRA protocols upon cell (re)selection to NR from E-UTRA while an inter-radio access technology (inter-RAT) (re)selection procedure is triggered.

13. The method of claim 10, wherein the priorities provided by the dedicated signaling are received through New Radio (NR) dedicated signaling to instruct the UE to move to an E-UTRA/NR RRC Inactive state or an E-UTRA/NR RRC Idle state.

14. The method of claim 13, further comprising:

configuring an initial value for the T320 timer upon reception of a t320 value within the NR dedicated signaling or based on a remaining validity time inherited from E-UTRA protocols upon cell (re)selection to NR from E-UTRA while inter-RAT (re)selection procedure is triggered.

15. The method of claim 9, further comprising:

implementing a cell selection in a different radio access technology (RAT) by changing a RAT associated with the UE from E-UTRA to NR in response to the SNPN selection request being performed by the UE.

16. The method of claim 10, further comprising:

storing redirected carrier information (redirectedCarrierInfo) after receiving a radio resource control (RRC) release (RRCRelease) message having the redirectedCarrierInfo; and after selecting the SNPN in response to receiving the SNPN selection request, performing at least one of the following:

aborting or stopping a cell selection procedure that is triggered after receiving the RRCRelease message having the redirectedCarrierInfo when the redirectedCarrierInfo indicates redirection to an Evolved Universal Terrestrial Radio Access (E-UTRA) cell; or removing the stored redirectedCarrierInfo.

17. The method of claim 10, further comprising:

reconsidering a cell as "not barred" after receiving the SNPN selection request if the cell is previously considered as "barred" by the UE.

18. The method of claim 10, further comprising:

applying at least one of a stored PLMN identity list and an SNPN identity list received from a serving cell as part of stored information without being impacted by SNPN access mode changes.

\* \* \* \* \*